(12) United States Patent
Smith

(10) Patent No.: US 9,949,438 B2
(45) Date of Patent: Apr. 24, 2018

(54) CONTINUOUS HARVESTER WITH CROP SUPPLY CHAMBER

(71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 13 days.

(21) Appl. No.: 14/996,186

(22) Filed: Jan. 14, 2016

(65) Prior Publication Data

US 2017/0202151 A1 Jul. 20, 2017

(51) Int. Cl.
*A01F 15/10* (2006.01)
*A01F 15/07* (2006.01)
*A01F 15/08* (2006.01)

(52) U.S. Cl.
CPC ...... *A01F 15/0705* (2013.01); *A01F 15/0715* (2013.01); *A01F 15/0875* (2013.01); *A01F 15/106* (2013.01); *A01F 2015/077* (2013.01)

(58) Field of Classification Search
CPC ............................ A01F 15/0705; B30B 9/301
USPC .................................. 56/341; 100/40, 88, 89
See application file for complete search history.

(56) References Cited

U.S. PATENT DOCUMENTS

| | | | |
|---|---|---|---|
| 4,514,969 A | 5/1985 | Moosbrucker et al. | |
| 4,542,617 A * | 9/1985 | Sonntag | A01F 15/106 100/88 |
| 4,580,398 A * | 4/1986 | Bruer | A01F 15/0705 100/5 |
| 4,656,812 A | 4/1987 | Busse et al. | |
| 4,686,812 A | 8/1987 | Bruer et al. | |
| 4,914,900 A * | 4/1990 | Viaud | A01F 15/0705 100/88 |
| 5,115,734 A * | 5/1992 | Quartaert | A01F 15/0705 100/5 |
| 5,136,831 A | 8/1992 | Fell et al. | |
| 6,295,797 B1 | 10/2001 | Naaktgeboren et al. | |
| 6,644,006 B1 | 11/2003 | Merritt et al. | |
| 6,688,092 B2 | 2/2004 | Anstey et al. | |
| 6,877,304 B1 | 4/2005 | Smith et al. | |
| 7,584,594 B2 | 9/2009 | Viaud | |
| 8,291,687 B2 | 10/2012 | Herron et al. | |
| 8,413,414 B2 | 4/2013 | Herron et al. | |
| 8,627,765 B2 * | 1/2014 | Reijersen Van Buuren | A01F 15/106 100/40 |

(Continued)

FOREIGN PATENT DOCUMENTS

DE 2634638 A1 2/1978
DE 3437294 A1 4/1986

(Continued)

*Primary Examiner* — John Weiss
(74) *Attorney, Agent, or Firm* — Patrick M. Sheldrake

(57) ABSTRACT

The disclosure relates to a harvester capable of continuous bailing of crop material, particularly to a harvester comprising a crop supply chamber positioned in front of a bale chamber, capable of storing crop material during the wrapping of a bale of harvested crop material. The crop supply chamber further comprises a supply inlet at the bottom of the crop supply chamber, a movable control plate positioned within the crop supply chamber, and a movable rear wall capable of adjusting the size of the supply inlet.

25 Claims, 14 Drawing Sheets

(56) References Cited

U.S. PATENT DOCUMENTS

| | | | |
|---|---|---|---|
| 8,707,865 B2* | 4/2014 | Oakes | A01F 15/0705 100/35 |
| 8,733,241 B2 | 5/2014 | Roberge | |
| 8,910,460 B2 | 12/2014 | Horstmann | |
| 9,084,394 B2 | 7/2015 | Roberge | |
| 9,253,948 B2* | 2/2016 | Olander | A01F 15/106 |
| 2013/0305683 A1 | 11/2013 | Ziembicki | |
| 2014/0165856 A1* | 6/2014 | Varley | A01F 15/0705 100/40 |
| 2015/0373915 A1 | 12/2015 | Roberge | |
| 2015/0373916 A1 | 12/2015 | Roberge | |

FOREIGN PATENT DOCUMENTS

| | | |
|---|---|---|
| DE | 3631159 A1 | 3/1988 |
| GB | 2003716 | 3/1979 |

\* cited by examiner

Prior Art

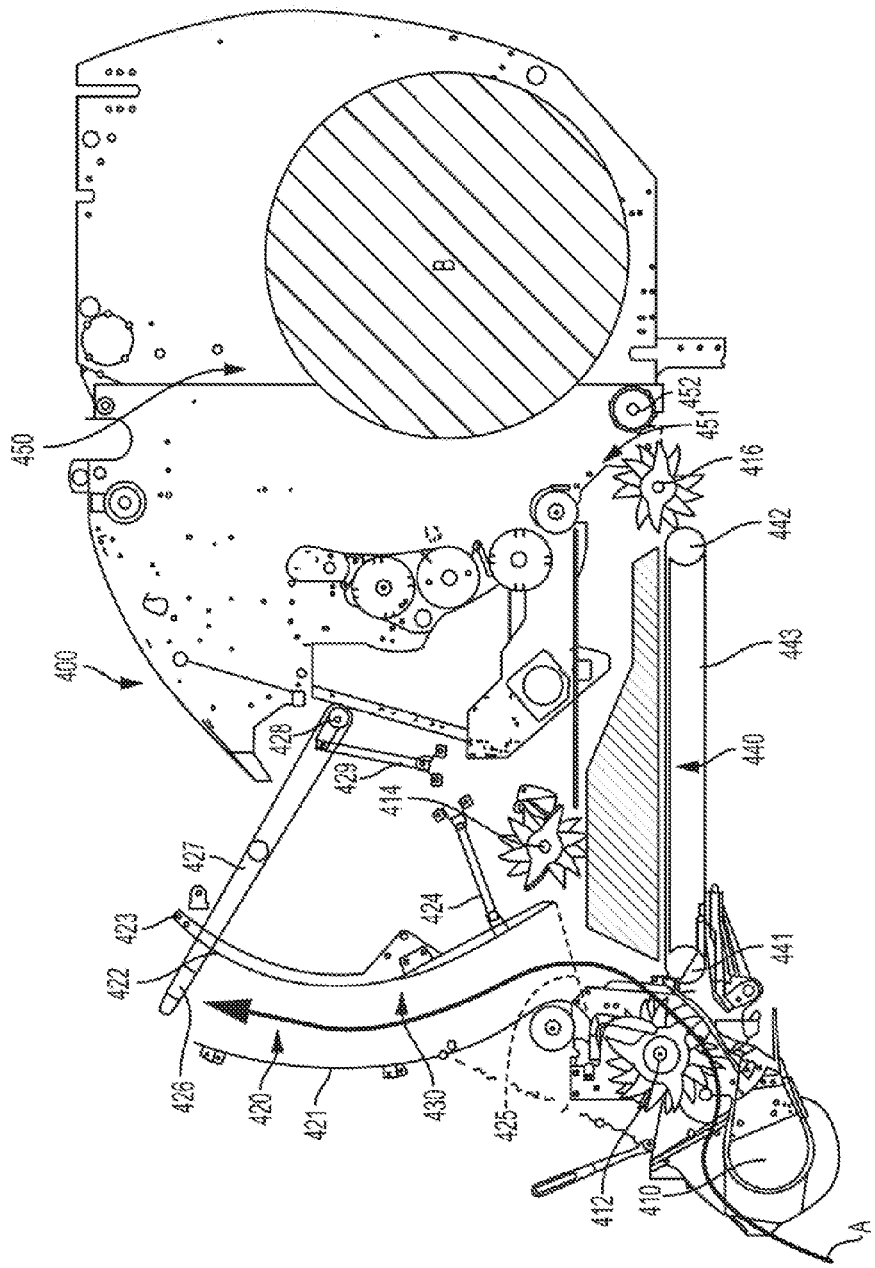

CONTINUOUS HARVESTER WITH CROP SUPPLY CHAMBER

TECHNOLOGY FIELD

The present disclosure relates generally to a harvester capable of continuous bailing of crop material, particularly to a harvester comprising a crop supply chamber capable of holding crop material during the wrapping of a bale of harvested crop material.

BACKGROUND

For many years agricultural balers have been used to consolidate and package crop material to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, the cut crop material is gathered at the front of the baler from along the ground, onto a pickup assembly, and introduced into a bale-forming chamber within the baler. Inside the cut crop is rolled up into a predetermined size. A conventional bale chamber may include a pair of opposing sidewalls with a series of belts, chains, and/or rolls that rotate and compress the crop material in to the cylindrically-shaped round bale. When the predetermined size is achieved, the cylindrically-shaped round bale is wrapped and bound by wrapping material, such as net wrapping, plastic wrapping, and/or wire. After the round bale is wrapped, the back of the baler, or tailgate, opens and the wrapped bale is discharged. The tailgate is then closed and the cycle repeated as necessary and desired to manage the field of cut crop material.

Conventional balers require a relatively long period of downtime, typically between 10 and 15 seconds, to open the tailgate of the baler and eject the wrapped bale. The downtime required reduced the overall efficiency of the harvesting system. Modified balers have been designed to allow for continuous harvesting, where crop can either be stored in a separate crop supply chamber (or "pre-chamber") or wrapped into a new bale, simultaneous with the wrapping and ejecting of a fully formed bale in the main bale chamber.

Types of pre-chambers have been previously described, for example in U.S. Pat. Nos. 4,514,969 and 4,656,812, which use pre-chambers located in front of a bale chambers to store crop material. Typical of many balers/pre-chamber designs, there is difficulty in both allowing crop material to enter the pre-chamber due to difficult flow angles or several moving parts, and having cropping material exit the pre-chamber in a controlled manner that consistently produces bales with uniform shape and density.

The instant application provides a continuous harvester with a crop supply chamber that is capable of storing crop material during the wrapping and ejecting of a bale, ejecting stored crop material during the creation of a new bale, and combining the stored crop material with new crop material to consistently create high quality bales of uniform shape and density.

SUMMARY

The present disclosure relates to a harvester comprising: a pair of oppositely facing sidewalls, mechanically attached to a subframe; a pickup assembly; a bale chamber, positioned between the pair of sidewalls, comprising an crop inlet at the front end of the bale chamber, and an outlet at the rear end of the bale chamber; a crop supply chamber, positioned between the pair of sidewalls and in front of the bale chamber, comprising an supply inlet at the bottom of the crop supply chamber and a movable control plate positioned within the crop supply chamber; and a crop gating system, positioned between the front of the crop inlet of the bale chamber and the pickup assembly, further positioned below the supply inlet of the crop supply chamber; wherein the crop gating system comprises at least a first element movable in at least a first and second operable position, wherein in the first operable position the crop gating system facilitates the movement of crop material from the pickup assembly into the bale chamber.

In some embodiments, the crop supply chamber further comprises a front wall, a rear wall, and a storage volume; wherein the storage volume is defined by the space between the front wall, the rear wall, the pair of oppositely facing sidewalls, the control plate and the supply inlet.

In some embodiments, the crop supply chamber further comprises: a rear wall pivot point, positioned between the pair of sidewalls and operably connected to the rear wall, such that the rear wall is selectively adjustable in a forward and a rearward direction around the pivot point; and at least one rear wall hydraulic actuator, operably connected to the rear wall such that extension of the hydraulic actuator moves the rear wall around the pivot point.

In some embodiments, the movement of the rear wall around the rear wall pivot point by the rear wall hydraulic actuator is capable of altering the shape of the storage volume, such that, when the bottom of the rear wall moves in a forward direction, the distance between the front wall and the rear wall is smaller at the bottom than the top of the crop supply chamber, and when the bottom of the rear wall moves in a rearward direction, the distance between the front wall and the rear wall is larger at the bottom than the top of the crop supply chamber.

In some embodiments, the height of the crop supply chamber is substantially higher than its width, and at least a portion of the crop supply chamber is arced and adjacent to or substantially adjacent to the bale chamber; and wherein the control plate covers at least one horizontal plane of the crop supply chamber and its edges contact or are proximate to each of the front wall, rear wall, and sidewalls, such that the control plate defines a vertical or substantially vertical height of the storage volume past which stored crop material cannot be stored.

In some embodiments, the crop supply chamber further comprises: a control arm pivot point, positioned between the pair of sidewalls; at least one control arm, operably connected to the control plate at one end and to the control arm pivot point at the other end; and at least one control arm hydraulic actuator operably connected to the at least one control arm; wherein the control arm pivot point is positioned between the storage volume and the bale chamber; and wherein the control plate and control arms are capable of movement in an upward and a downward direction around the pivot point.

In some embodiments, the movement of the control plate and control arms by the control arm hydraulic actuator is capable of altering the shape of the storage volume, such that, when the control plate moves in a radially upward direction, the storage volume increases in size, and when the control plate moves in a radially downward direction, the storage volume decreases in size.

In some embodiments, the crop supply chamber further comprises a first, second, and third operable positions, wherein: the first operable position, the rear wall is positioned in a forward direction and the control plate is positioned at or approximately at the bottom of the front and rear walls, such that the control plate occludes the supply inlet of the crop supply chamber and the storage volume is or approximately is zero; the second operable position, the rear wall is positioned in the forward direction and the control plate is positioned at or approximately at the top of the front and rear walls, such that the distance between the front and rear walls is smaller at the bottom than the top of the crop supply chamber, the control plate does not occlude the supply inlet of the crop supply chamber, and the storage volume is at or approximately at a maximum size; the third operable position, the rear wall is positioned in a rearward direction and the control plate is positioned at or approximately at the bottom of the front and rear walls, such that the distance between the front and rear walls is larger at the bottom than the top of the crop supply chamber and the control plate partially occludes the supply inlet of the crop supply chamber.

In some embodiments, the at least one rear wall hydraulic actuator can move the rear wall around the rear wall pivot point, and the at least one control arm hydraulic actuator can rotate the at least one control arm and the control plate around the control arm pivot point, such that the crop supply chamber can transition between the first, second, and third operable positions and the storage volume can transition between zero and the maximum size.

In some embodiments, crop material enters into the storage volume of the crop supply chamber when the crop supply chamber is transitioning from the first operable position to the second operable position; and wherein crop material stored in the storage volume enters into the bale chamber the crop supply chamber is transitioning from the second operable position to the third operable position.

In some embodiments, the harvester further comprises: a serpentine system arranged for the bale chamber, comprising a plurality of baling belt rollers in operable contact with one or more baling belts, the plurality of baling belts rollers comprising at least two lower baling belt rollers positioned on either side of the crop inlet of the bale chamber; a tailgate, capable of occluding the outlet of the bale chamber in a closed position and exposing the outlet of the bale chamber in one or more open positions; a net wrap mechanism, positioned at the rear of the harvester, capable of wrapping a formed bale in the bale chamber prior to ejection of said bale from the harvester; a cutting rotor, positioned between the pickup assembly and the crop gating system; a feeding rotor, capable of assisting the entry of crop material into the bale chamber; a bale diameter sensor, capable of determining the size of a bale in the bale chamber; a control arm sensor, capable of determining the position of the control arm and control plate in the crop supply chamber; a rear wall sensor, capable of determining the position of the rear wall of the crop supply chamber; and a controller, operably connected to the bale diameter sensor, the control arm sensor, the rear wall sensor, the at least one rear wall hydraulic actuator, the at least one control arm hydraulic actuator, and the crop gating system.

In some embodiments, the harvester further comprises at least a first, second, and third operable modes, wherein in the first operable mode, crop material is collected by the pickup assembly, passed through the cutting rotor, and directed into the bale chamber by the crop gating system; in the second operable mode, the crop supply chamber transitions from the first operable position to the second operable position; wherein crop material is collected by the pickup assembly, passed through the cutting rotor, and directed into the crop supply chamber; in the third operable condition, the crop supply chamber transitions from the second operable position to the third operable position; wherein crop material is collected by the pickup assembly, passed through the cutting rotor, directed into the bale chamber by the crop gating system, and, simultaneously, stored crop material in the storage volume exits the crop supply chamber and is also directed into the bale chamber by the crop gating system.

In some embodiments, the harvester transitions from the first or the third operable mode to the second operable mode when the bale diameter sensor detects that a bale in the bale chamber has reached a predetermined size.

In some embodiments, wherein the harvester transitions from the second operable mode to the third operable mode when the bale diameter sensor detects that no bale exists in the bale chamber.

In some embodiments, the controller independently adjusts the movement of the control plate and the rear wall such that, during the third operable mode of the harvester, the crop supply chamber is at the third operable position prior to the bale in the bale chamber reaching its predetermined size.

In some embodiments, wherein the controller independently adjusts the movement of the control plate and the rear wall such that, during the third operable mode of the harvester, the crop supply chamber reaches its third operable position simultaneously with the bale in the bale chamber reaching its predetermined size.

In some embodiments, the harvester further comprises an operator interface, capable of receiving information from and electronically connected to the controller, and displaying the information to an operator, wherein the information comprises one or more of the following: operable mode of the harvester, position of the control plate in the crop supply chamber, position of the rear wall in the crop supply chamber, and direction of crop flow into or out of the crop supply chamber.

In some embodiments, the crop gating system further comprises a deflection panel operably connected to and capable of radial movement around a second pivot point positioned between the pair of sidewalls of the harvester; and a deflection hydraulic actuator, operably connected to the controller and capable of moving the deflection panel around the second pivot point.

In some embodiments, the crop gating system further comprises a conveyor system, positioned between the front of the crop inlet of the bale chamber and the pick up assembly, and, further positioned below the supply inlet of the crop supply chamber, the conveyor system comprising: a front roller, a rear roller, at least one conveyor belt, and a motor operably connected to the controller and capable of endlessly rotating the conveyor belt around the front and rear rollers of the crop gating system; wherein the at least one conveyor belt rotates around the front and rear rollers such that, at any point in time, the top portion of the conveyor belt moves towards the inlet in the first operable mode of the crop gating system; and wherein the at least one conveyor belt does not rotate around the front and rear rollers in the second operable mode of the crop gating system.

The present disclosure also relates to a harvester comprising: a pair of oppositely facing sidewalls, mechanically attached to a subframe; a pickup assembly; a bale chamber, positioned between the pair of sidewalls, comprising a crop inlet at the front end of the bale chamber, and an outlet at the rear end of the bale chamber; and a crop supply chamber, positioned between the pair of sidewalls and in front of the bale chamber, comprising a supply inlet at the bottom of the crop supply chamber, a front wall, a rear wall, and a storage volume.

In some embodiments, the storage volume is defined by the space between the front wall, the rear wall, the pair of oppositely facing sidewalls, and the supply inlet.

In some embodiments, the height of the rear wall is substantially higher than its width, and at least a portion of the crop supply chamber is arced and adjacent to or substantially adjacent to the bale chamber.

In some embodiments, the crop supply chamber further comprises: a rear wall pivot point, positioned between the pair of sidewalls and operably connected to the rear wall, such that the rear wall is selectively adjustable in a forward and a rearward direction around the pivot point; and at least one rear wall hydraulic actuator, operably connected to the rear wall such that extension of the hydraulic actuator moves the rear wall around the pivot point.

In some embodiments, the movement of the rear wall around the rear wall pivot point by the rear wall hydraulic actuator is capable of altering the shape of the storage volume, such that, when the bottom of the rear wall moves in a forward direction, the distance between the front wall and the rear wall is smaller at the bottom than the top of the crop supply chamber, and when the bottom of the rear wall moves in a rearward direction, the distance between the front wall and the rear wall is larger at the bottom than the top of the crop supply chamber.

In some embodiments, wherein the movement of the rear wall is capable of controlling the rate at which crop material enters into and ejects from the crop supply chamber.

The present disclosure also relates to a method of harvesting crop material comprising: (a) collecting crop material by a pickup assembly; (b) preventing entry of crop material into a crop supply chamber and allowing entry of crop material into a bale chamber by a crop gating system; (c) detecting when crop material has formed a bale of predetermined size; (d) wrapping and ejecting the bale while simultaneously allowing entry of crop material into the crop supply chamber and preventing entry of crop material into the bale chamber by a crop gating system; (e) detecting when the bale of crop material has been ejected from the bale chamber; (f) ejecting crop material from the crop supply chamber while continuing to collect new crop material by the pickup assembly; and (g) allowing entry of crop material from both the crop supply chamber and the pickup assembly into the bale chamber by a crop gating system. In some embodiments, the method further comprises step (h) repeating steps (c) to (g).

In some embodiments, preventing entry of crop material into a crop supply chamber in step (b), allowing entry of crop material into the crop supply chamber in steps (d) and (g), and ejecting crop material from the crop supply chamber in step (f) are performed by the synchronous movement of a control plate and a rear wall.

In some embodiments, the method further comprises providing information to an operator via an operator interface about one or more of the following: position of the control plate in the crop supply chamber, position of the rear wall in the crop supply chamber, and direction of crop flow into or out of the crop supply chamber.

BRIEF DESCRIPTION OF THE DRAWINGS

FIGS. 4A-4F depict various stages of a baling cycle in a harvester with a crop supply chamber and a conveyor system.

DETAILED DESCRIPTION OF THE DISCLOSURE

Figure 1:
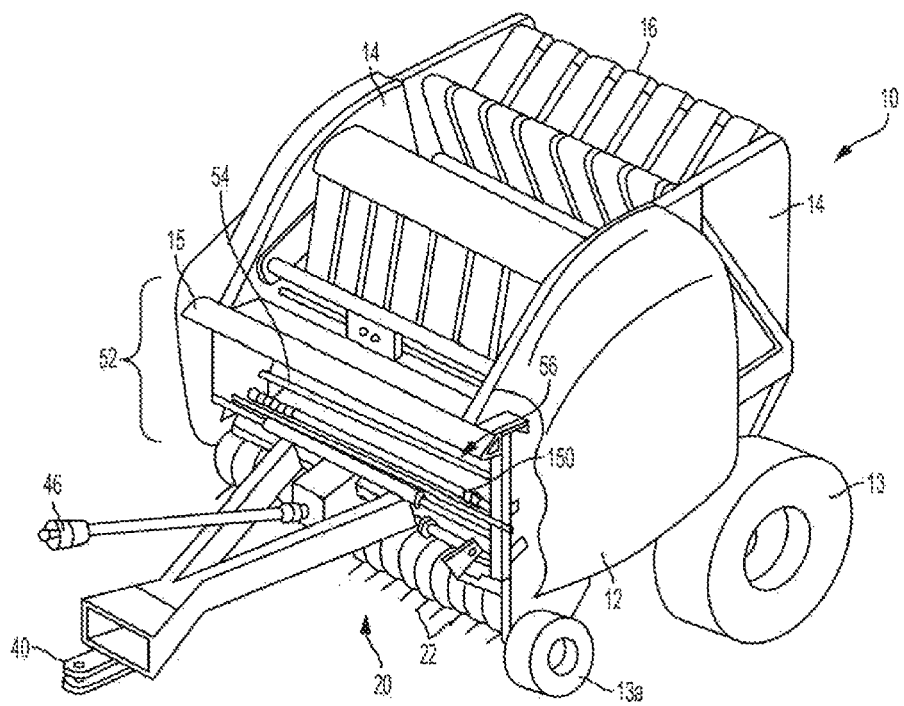
FIG. 1 depicts a static image of a conventional baler.

Various terms relating to the methods and other aspects of the present disclosure are used throughout the specification and claims. Such terms are to be given their ordinary meaning in the art unless otherwise indicated. Other specifically defined terms are to be construed in a manner consistent with the definition provided herein.

As used in this specification and the appended claims, the singular forms "a," "an," and "the" include plural referents unless the content clearly dictates otherwise.

The term "more than 2" as used herein is defined as any whole integer greater than the number two, e.g. 3, 4, or 5.

The term "plurality" as used herein is defined as any amount or number greater or more than 1.

The terms "left" or "right" are used herein as a matter of mere convenience, and are determined by standing at the rear of the machine facing in its normal direction travel. Likewise, "forward" and "rearward" are determined by the normal direction of travel. "Upward" and "downward" orientations are relative to the ground or operating surface as are any references to "horizontal" or "vertical" planes.

The term "about" as used herein when referring to a measurable value such as an amount, a temporal duration, and the like, is meant to encompass variations of ±20%, ±10%, ±5%, ±4%, ±3%, ±2%, ±1%, ±0.5%, or ±0.1% from the specified value, as such variations are appropriate to perform the disclosed methods.

The term "harvester" as used herein is defined as a machine that consolidates and/or packages material so as to facilitate the storage and handling of the material for later use. In some embodiments, the harvester is used to harvest agricultural material. In some embodiments, the harvester is an agricultural baler, a waste baler, cotton harvester or a combine comprising a baling mechanism. In some embodiments, the harvester is a round baler.

The term "material" as used herein is defined as a numerous individual items that are harvested or collected by the harvester. In some embodiments, the material is agricultural crop, such as hay or silage. In some embodiments, the material is biomass.

The term "pickup assembly" as used herein is defined as an element responsible for collecting material from the ground over which the harvester operates. A harvesting assembly includes a mechanism to pick up the material from the ground, and such mechanisms are well known in the agricultural industry. Reference is made, for example, to U.S. Patent Application No. US20130305683, which is incorporated herein by reference in its entirety, that illustrates such mechanisms.

As used herein, the term "roll" or "roller" are used interchangeably to mean a substantially cylindrical member that rotates about an axis. In some embodiments, the rolls are components of the serpentine system and run longitudinally and/or transversely across the width of the agricultural harvester or system and support one or a plurality of baling belts that convey harvested crop material in the harvester or system while the harvester or system is in operation.

The term "bale chamber" as used herein is defined as any space within the harvester that is capable of forming a bale of harvested material. In some embodiments, the sides of the bale chamber are defined by oppositely facing side walls and the bottom of the bale chamber is defined by at least one floor roll that spans transverse to the sidewalls and that partially supports the weight of the bale in the bale chamber. In some embodiments, the bale chamber is also defined in its front region by an inlet through which harvested material or crop enters. In some embodiments, the front region of a first bale chamber is defined by an inlet or entry point which is in operable connection to a throat of a crop harvesting assembly, such as a pickup or rotary cutter, and which is defined in a space between the first sidewall, the second sidewall, the bale carrier, and a plurality of rollers positioned between and attached to the first and second sidewalls; wherein the plurality of rollers support one or more baling belts. In some embodiments, at least one, at least two, at least three, or at least four floor rollers extend transverse to the opposite sidewalls along the bottom and front of the bale chamber adjacent to the top and bottom of the entry point. In some embodiments, a bale carrier is positioned in and defines the back of the bale chamber by obstructing an outlet in it fully closed position. In some embodiments, the rollers extending beyond the side walls allow the width of the bale chamber to be selectively increased. In some embodiments, side walls which can be moved laterally, i.e., in the direction of the width of the round baler, that enable making bales of different width or the friction between the walls and bale to be reduced when ejecting the bale. In some embodiments, the top portion of the bale chamber is define by the position of one or more baling belts that wrap around a top portion of the crop material as its rotating in the bale chamber. In some embodiments, the baling belts are mounted on a series of rolls positioned above the bale chamber that exact tension on a the bale as it grows.

The term "wrapping mechanism" as used herein is defined as a mechanical device or assembly that uses wrapping material to wrap a formed bale.

The term "wrapping material" as used herein is defined as a net, mesh, twine, plastic film, or other material that is used for the wrapping of a bale in order to maintain the shape and density of said bale and optionally protect it from weather or other external conditions.

The term "crop supply chamber" as used herein is defined as an any space within the harvester that is capable of storing crop material. In some embodiments, the crop supply chamber is capable of storing crop material when the flow of crop material is directed into the crop supply chamber. In some embodiments, the crop supply chamber is capable of storing crop material when a bale chamber is not capable of receiving crop material, for example, because the bale chamber contains a fully formed bale. In some embodiments, the crop supply chamber is positioned in front of a bale chamber. In some embodiments, the crop supply chamber is defined by a front wall, a rear wall, and a pair of sidewalls. In some embodiments, the crop supply chamber comprises a front wall, a rear wall, a pair of sidewalls, and a storage volume. In some embodiments, the crop supply chamber comprises a front wall, a rear wall, a pair of sidewalls, a storage volume and a control plate. In some embodiments, the crop supply chamber is curved.

The term "storage volume" as used herein is defined as any space within a crop supply chamber that is capable of storing crop material. In some embodiments, the storage volume is defined by the space between the front wall of the crop supply chamber, the rear wall of the crop supply chamber, the pair of oppositely facing sidewalls of the harvester, the control plate, and the inlet of the crop supply chamber. In some embodiments, the crop supply chamber is capable of both storing crop material in the storage volume and releasing stored crop material from the storage volume. In some embodiments, the size of the storage volume can change. In some embodiments, the size of the storage volume increases as crop material enters the storage volume. In some embodiments, the size of the storage volume decreases as crop material exits the storage volume. In some embodiments, the increasing size of the storage volume facilitates the entrance of crop material in the storage volume. In some embodiments, the decreasing size of the storage volume facilitates the exiting of crop material from the storage volume. In some embodiments, the storage volume is curved.

The term "control plate" as used herein is defined as an element in the crop supply chamber that defines the upper boundary of the storage volume. In some embodiments, the control plate is or comprises one or more of the following: a solid plate, a series of bars, and mesh or wire. In some embodiments, the control plate is flat. In some embodiments, the control plate is curved. In some embodiments, the control plate is capable of movement within the crop supply chamber. In some embodiments, the control plate prevents crop material from moving beyond the top of the storage volume. In some embodiments, the control plate pushes crop material out of the storage volume. In some embodiments, the control plate is operably connected to a mechanical arm which facilitates the movement of the control arm in the crop supply chamber. In some embodiments, the control arm is capable of moving from the bottom of the crop supply chamber to the top of the crop supply chamber. In some embodiments, the control arm is capable of occluding the opening on the crop supply chamber.

The term "crop gating system" as used herein is defined as a system in a harvester that is capable of altering the direction of the crop material once said crop material is present in the harvester. In some embodiments, the crop gating system is capable of diverting crop material from one particular location with the harvester, and transporting it to another particular location within the harvester. In some embodiments, the crop gating system directs or is capable of allowing/directing crop material to enter a bale chamber. In some embodiments, the crop gating system prevents or is capable of preventing crop material from entering the bale chamber. In some embodiments, the crop gating system directs or is capable of allowing/directing crop material to enter into a crop supply chamber. In some embodiments, the crop gating system is capable of preventing crop material from entering the crop supply chamber. In some embodiments, the crop gating system can be synchronous with the sequential operation of the harvester, such that, as the harvester is wrapping and ejecting a bale from its bale chamber, the crop gating system prevents crop material from entering into the bale chamber and/or allows crop material to enter into a crop supply chamber. In some embodiments, the crop gating system can be synchronous with the sequential operation of the harvester, such that, as the harvester is growing a bale in the bale chamber, the crop gating system allows crop material from a pick-up assembly of the harvester and crop material from the crop supply chamber to enter into the bale chamber. Any of these steps may be accomplished by one or a plurality of conveyors comprising one or a plurality of endless belts, chains or other movable surfaces in operable contact with one or a plurality of rolls. In those embodiments where crop material is callable of being diverted to one or a plurality of different compartments or spaces within the harvester, the harvester comprises at least one panel which may be operably connected to a one or a plurality of controllers that control movement of the at least one panel so that entry into one or the plurality of compartments or space is blocked. In some embodiments, movement of the panel or panels is coordinated with the position of a bale in the bale chamber. In some embodiments, movement of the panels is coordinated with the position of a bale in the bale chamber such that, when a bale in the bale chamber is ready to be ejected from the harvester, a panel positioned at or adjacent to or proximate to the conveyor leading to the bale chamber blocks crop material from entering the bale chamber. The crop material is then diverted to the crop supply chamber where it can be stored temporarily until the fully formed bale has been ejected and the In some embodiments, the crop gating system comprises a deflection panel. In some embodiments, the deflection panel is capable of rotation around a pivot point. In some embodiments, the deflection panel is operably connected to a hydraulic actuator capable of rotating the deflection panel around the pivot point. In some embodiments, the deflection panel does not occlude the entry point of the bale chamber in a first operable mode of the crop gating system. In some embodiments, the deflection panel does occlude the entry point of the bale chamber in a second operable mode of the crop gating system. In some embodiments, the crop material is directed from a pickup assembly and into a crop supply chamber by the deflection panel.

In some embodiments, the crop gating system comprises a front roller, a rear roller, at least one conveyor belt, and a motor operably connected to the controller and capable of endlessly rotating the conveyor belt around the front and rear rollers of the crop gating system. In some embodiments, the at least one conveyor belt rotates around the front and rear rollers such that, at any point in time, the top portion of the conveyor belt moves towards the entry point of the bale chamber in a first operable mode of the crop gating system; and wherein the at least one conveyor belt does not rotate around the front and rear rollers in a second operable mode of the crop gating system. In some embodiments, the entry of the crop material into the bale chamber is facilitated by the crop gating system when the conveyor belt is rotating. In some embodiments, the entry of the crop material into the crop supply chamber is facilitated by the crop gating system when the conveyor belt is not rotating. In some embodiments, the conveyor belt comprises a series slats connected by chains.

In some embodiments, the crop gating system comprises at least one auger, and a motor operably connected the at least one auger and capable of rotating the at least one auger around an axis. In some embodiments, the rotation of the at least one auger is capable of moving crop material towards the entry point of a bale chamber. In some embodiments, the entry of the crop material into the bale chamber is facilitated by the crop gating system when the at least one auger is rotating. In some embodiments, the entry of the crop material into the crop supply chamber is facilitated by the crop gating system when the at least one auger is not rotating.

In some embodiments, the crop gating system comprises at least one rotor, and at least one motor operably connected to at least one rotor and capable of rotating the at least one rotor around an axis. In some embodiments, the crop gating system comprises a series of rotors, each rotor individually connected to a motor capable of rotating the rotor around its axis. In some embodiments, the rotation of the at least one rotor is capable of moving crop material towards the entry point of a bale chamber. In some embodiments, the entry of the crop material into the bale chamber is facilitated by the crop gating system when the at least one rotor is rotating. In some embodiments, the entry of the crop material into the crop supply chamber is facilitated by the crop gating system when the at least one rotor is not rotating.

The term "information" as used herein is defined as data values attributed to parameters. In some embodiments, information is digital and/or analog information. In some embodiments, information is the current rotation angle of a bottom floor assembly. In some embodiments, information is the current rotation angle of a rotation sensor. In some embodiments, information is warning information, such as warning information sent to a display or a type of operator interface. In some embodiments, warning information can be audio and/or visual information. In some embodiments, warning information is information that is capable of alerting an operator that an action may need to be taken.

Discussions herein utilizing terms such as, for example, "processing," "computing," "calculating," "determining," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be or may include an electronic, magnetic, optical, electromagnetic, InfraRed (IR), or semiconductor system (or apparatus or device) or a propagation medium. Some demonstrative examples of a computer-readable medium may include a semiconductor or solid state memory, magnetic tape, a removable computer diskette, a Random Access Memory (RAM), a Read-Only Memory (ROM), a rigid magnetic disk, an optical disk, or the like. Some demonstrative examples of optical disks include Compact Disk-Read-Only Memory (CD-ROM), Compact Disk-Read/Write (CD-R/W), DVD, or the like.

In some embodiments, the disclosure relates to a processing system comprising a processing device suitable for storing and/or executing program code and may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, I/O devices may be coupled to the system directly or to I/O controller by an I/O bus (cables and or wires which connect the devices and enable the information to pass therebetween). In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

The term "real-time" and the phrase "in real-time" as used herein are defined as a way of describing a process, event, or action that occurs simultaneously with the process of actively forming a bale in a bale chamber. In some embodiments, various sensors, for example a rotation sensor, continuously sense information about the rotation angle of a bottom floor assembly and transmit that information to a controller in real-time. In some embodiments, an operator may adjust values in an operator interface in real-time by accessing the system electronically and inputting one or a plurality of values.

The term "pre-determined size" as used herein is defined as a value which is determined, set, or calculated before the completion of a bale forming cycle, such that, when a bale forming in a bale chamber reaches the value, an event occurs. For example, if the pre-determined size is a specified bale diameter, a harvester may begin a bale wrapping and ejection cycle when bale sensors determine that the forming bale has reached the specified diameter. In some embodiments, the pre-determined size is determined prior to the start of a bale forming cycle. In some embodiments, the pre-determined size is a parameter of diameter, weight, density, moisture content, or position. In some embodiments, the determination of whether a bale has reached the pre-determined size is within the error range of the sensors and controllers involved in the determination. In some embodiments, the determination of whether a bale has reached the pre-determined size is within ±10% of the pre-determined size value. In some embodiments, an operator determines the pre-determined size values. In some embodiments, a controller or other software program determines the pre-determined size values. In some embodiments, an operator provides the pre-determined size values via an operator interface that is in electronic communication with one or more controllers. In some embodiments, a combination of an operator and a controller or other software program determines the pre-determined size values.

Many of the fastening, connection, processes and other means and components utilized in this disclosure are widely known and used in the field of the disclosure described, and their exact nature or type is not necessary for an understanding and use of the disclosure by a person skilled in the art, and they will not therefore be discussed in significant detail. Furthermore, the various components shown or described herein for any specific application of this disclosure can be varied and the practice of a specific application of any element may already be widely known or used in the art by persons skilled in the art and each will likewise not therefore be discussed in significant detail.

Agricultural harvesters, such as round balers, are well known in the agricultural industry, and the instant disclosure can be used with substantially any of such machines. Reference is made, for example, to U.S. Pat. Nos. 9,084,394; 8,733,241, 8,413,414, 8,291,687, 6,877,304; 6,688,092; 6,644,006 and 6,295,797, 5,136,831 and U.S. patent Publication Ser. Nos. 14/316,209, and 14/316,162 that illustrate such harvesters, the disclosures of which are incorporated herein by reference in their entirety. Embodiments of the present disclosure are particularly well suited, but in no way limited to, use with agricultural balers. The present disclosure may also find utility in agricultural harvesters including, for example, a round baler, a waste baler, a cotton harvester, or a combine. In some embodiments, the combine comprises a baling mechanism. Cross-reference is made to U.S. Patent Applications covering Invention disclosure nos. 52322 and 52341, both entitled "Continuous Harvester with Crop Supply Chamber", filed on Jan. 14, 2016, contemporaneously with this application, both of which are incorporated herein by reference in their entirety.

The present disclosure also relates to a continuous harvester, capable of harvesting crop material even while wrapping and ejecting a fully formed bale from its bale chamber. Crop material harvested while the bale is being wrapping and ejected is directed into a crop supply chamber, located in front of the bale chamber, that temporarily stores the crop material. Once the bale is ejected from the bale chamber and the harvester is ready to begin the formation of a new bale, the crop material stored in the crop supply chamber is gradually added to the newly harvested crop material, and the combined crop supply is used to form a new bale.

In some embodiments, a control plate is present in the crop supply chamber that controls or defines the available space, or storage volume, within which crop material may be stored or to which crop material may be diverted. The control plate is capable of moving back and forth in a direction consistent to or relative to the at least one side of the crop supply chamber. For instance, in some embodiments, if the crop supply chamber comprises a side oriented in a vertical or substantially vertical direction, the length of the crop supply chamber is greater than its width, and the control plate is capable of movement upward and downward in the crop supply chamber to vary the size of the storage volume. When the control plate moves upward, the storage volume increases in size and more crop material can be placed within the crop supply chamber. When the control plate moves downward, the storage volume decreases in size and stored crop material is ejected from the crop supply chamber. In some embodiments, if the crop supply chamber comprises a side oriented in a horizontal or substantially horizontal direction, the width of the crop supply chamber is greater than its length, and the control plate is capable of movement forward or backward in the crop supply chamber to vary the size of the storage volume. The movement of the control plate is controlled by a control arm and hydraulic cylinder, which in turn is controlled by a processing unit or controller. The position and speed of the control plate, and thus the size and the rate of change of the storage volume, is regulated to both contain and store all of the necessary crop material while a bale is being wrapping and ejected, and to gradually but completely eject all of the stored crop material while a new bale is being formed.

In some embodiments, the wall of the crop supply chamber closest to the bale chamber (the "rear wall"), is capable of movement around a pivot point. The rear wall is capable of moving forward and backward around the pivot point to vary the size of the storage volume in such a way that it makes it easier or harder for the crop material to enter or exit the storage volume. When the rear wall pivots forward, the storage volume and the supply chamber inlet decrease in size. When the rear wall pivots backward, the storage volume and the supply chamber inlet increase in size. In some embodiments, the pivot point is at or near the top of the rear walls. In some embodiments, the pivot point is anywhere along the length of the rear wall. In some embodiments, the movement of the rear wall is controlled by a hydraulic cylinder, which in turn is controlled by a processing unit or controller. In some embodiments, the wall of the crop supply chamber further away from the bale chamber (the "front wall"), is capable of movement around a pivot point. In some embodiments, both the front and the rear wall are capable of movement around one or more separate pivot points.

In some embodiments, the movement of the rear wall coincides with specific movements of the control plate. When the control plate is moving upward, the rear wall is in a forward position, such that the supply chamber inlet is smaller compared to the width of the storage volume. This allows for crop material to move easily to the top of the storage volume near the control plate, as the top of the storage volume is larger in width than the width of the supply chamber inlet. In some embodiments, the rear wall can move partially or fully backward during the filling of the crop supply chamber if it becomes necessary to increase the width of the supply inlet. In some embodiments, when or approximately when the control plate first begins to move downward, the rear wall moves forward, if it is not in this position already, reducing the size of the supply inlet in preparation for the ejection of the crop material stored in the supply chamber. When the control plate is moving downward, the rear wall moves backward, such that the rear wall is furthest back when the control plate is at its lowest point in the supply chamber. This allows for the crop material to more easily exit the storage volume as it is ejected. In some embodiments, the rate of movement of the rear wall when the control plate is moving downward is controlled, such that crop material is being ejected from the supply chamber at a desired rate. In some embodiments, the rate at which the rear wall moves backwards can be slowed or reduced to zero if crop material is ejecting from the supply chamber too quickly. In some embodiments, the rear wall can be moved forward if crop material is ejecting from the supply chamber too quickly. In some embodiments, the rate at which the rear wall moves backwards can be increased if crop material is ejecting from the supply chamber too slowly. In some embodiments, rate of downward movement of the control plate and the rate of backward movement of the rear wall can be independently and selectively adjusted to maintain a desired rate crop material is ejecting from the crop supply chamber. For example, if crop material is ejecting from the crop supply chamber too quickly, the downward movement of the control plate can be slowed, or the backward movement of the rear wall can be slowed, stopped, or reversed, or some combination of adjustments to the movement of the control plate and the rear wall can be made simultaneously or sequentially.

In some embodiments, a conveyor system is located between the crop supply chamber and the bale chamber that controls the movement of the crop material toward the bale chamber. In some embodiments, a conveyor is attached at one or more positions to the subframe of the harvester. The connection to the subframe may be made by one or a plurality of tension rods, bolts, screws, rivets and or other connection elements. A belt or belts of the conveyor system carry crop material into the bale chamber by endless rotation around a plurality of belt rollers, but, in some embodiments, the belts stop rotating when a bale is being wrapped and ejected. The conveyor system is capable of storing crop material on it when the conveyor belts are not revolving. The conveyor system is also capable of moving newly harvested crop as well as crop exiting the crop supply chamber toward the bale chamber.

In some embodiments, a deflector system is located between the crop supply chamber and the bale chamber that controls the movement of the crop material into the bale chamber. A deflector plate can be raised and lowered, such that when the plate is lowered crop material can pass into the bale chamber, but when the plate is raised crop material is prevented from passing into the bale chamber. In some embodiments, when the deflection panel is raised, crop material is capable of moving into the crop supply chamber.

In some embodiments, the disclosure relates to a crop supply chamber or a harvester comprising a crop supply chamber, wherein the crop supply chamber comprises a first, second, and third operation positions. In the first operable position, the rear wall is positioned in a forward direction and the control plate is positioned at or approximately at the bottom of the front and rear walls, such that the control plate occludes a supply inlet of the crop supply chamber and a storage volume is or approximately is zero. In the second operable position, the rear wall is positioned in the forward direction and the control plate is positioned at or approximately at the top of the front and rear walls, such that the distance between the front and rear walls is smaller at the bottom than the top of the crop supply chamber, the control plate does not occlude the supply inlet of the crop supply chamber, and the storage volume is at or approximately at a maximum size. In the third operable position, the rear wall is positioned in a rearward direction and the control plate is positioned at or approximately at the bottom of the front and rear walls, such that the distance between the front and rear walls is larger at the bottom than the top of the crop supply chamber and the control plate partially occludes the supply inlet of the crop supply chamber.

In some embodiments, the disclosure relates to a harvester comprising a crop supply chamber and a crop gating system, wherein the harvester comprises at least a first, second, and third operable modes. In the first operable mode, crop material is collected by the pickup assembly, passed through the cutting rotor, and directed into the bale chamber by the crop gating system. In the second operable mode, the crop supply chamber transitions from the first operable position to the second operable position; wherein crop material is collected by the pickup assembly, passed through the cutting rotor, and directed into the crop supply chamber. In the third operable condition, the crop supply chamber transitions from the second operable position to the third operable position; wherein crop material is collected by the pickup assembly, passed through the cutting rotor, directed into the bale chamber by the crop gating system, and, simultaneously, stored crop material in the storage volume exits the crop supply chamber and is also directed into the bale chamber by the crop gating system.

In some embodiments, the disclosure relates to a method of harvesting crop material in a continuous harvester that comprises a crop supply chamber and a crop gating system. The method comprises steps: (a) collecting crop material from the ground by a pickup assembly; (b) directing crop material from the pickup assembly to the bale chamber by a crop gating system disclosed herein; or preventing entry of crop material into a crop supply chamber and allowing entry of crop material into a bale chamber by a crop gating system disclosed herein; (c) detecting when crop material has formed a bale of predetermined size; (d) wrapping and ejecting the bale while simultaneously allowing entry of crop material into the crop supply chamber and preventing entry of crop material into the bale chamber by a crop gating system; (e) detecting when the bale of crop material has been ejected from the bale chamber; (f) ejecting crop material from the crop supply chamber while continuing to collect new crop material by the pickup assembly; and (g) directing crop material from the pickup assembly to the bale chamber by a crop gating system disclosed herein; or allowing entry of crop material from both the crop supply chamber and the pickup assembly into the bale chamber by a crop gating system.

In some embodiments, the method further comprises step (h): repeating steps (c) to (g) once twice, thrice or more. In some embodiments, the steps of the method are repeated as desired by an operator, for example an operator stops the harvester when all of the crop has been harvested or if the harvester run out of bale wrapping material. In some embodiments, preventing entry of crop material into a crop supply chamber in step (b), allowing entry of crop material into the crop supply chamber in steps (d) and (g), and ejecting crop material from the crop supply chamber in step (f) are performed by the synchronous movement of a control plate and/or a rear wall. In some embodiments, the aforementioned steps are synchronously performed but the movement is independently variable based upon the settings of the operator.

In some embodiments, the method is performed by a harvester comprising a crop supply chamber, a crop gating system, and one or more sensors. In some embodiments, the one or more sensors are capable of determining a range of information, including, but not limited to, one or a combination of: the size of a bale in the bale chamber (diameter and/or weight), the position of the tailgate, the position of the control arm, the position of the rear wall, and the position of the crop gating system. In some embodiments, the one or more sensors are in electronic communication with one or more controllers.

Referring to the figures, FIG. 1 depicts an example of a round baler. The round baler, generally designated 10 is enclosed by a main frame 12, comprising a plurality of rigid structural elements including a pair of side walls 14. Main frame 12 is supported by a pair of rear wheels 13. A forwardly mounted hitch 40, integrated with the main frame 12, provides for connection to a tractor, for examples. As shown, a power take off (PTO) shaft 46, is located herein about the hitch 40. In other balers, the PTO shaft may be located and connected to the tractor below the hitch. The PTO shaft draws energy from a tractor driving the hitch and transfer that energy to drive mechanisms in the baler 10. Rear side 16, typically comprises a tailgate what is closed during bailing and opened to eject finished bales. In conventional balers, storage to house spare rolls of wrapping material is typically located about the tailgate. The front side 15 of the baler faces the rear of a tractor as connected to by the hitch 40 and the PTO shaft 46. At the bottom of the front side, between a front pair of wheels 13*a*, and mounted to the mainframe 12, is the pickup 20. The pickup 20 is supported by the pair of front wheels 13*a*. Pickup tines 22 wrap around and connect within the pickup 20. The tips of the tines 22 are movable along a predetermined path along the ground to lift crop material from the ground and deliver it rearward along a generally horizontal path towards a floor roll (not shown) at the bottom of the later, which is rotatably mounted on main frame 12. During baling, the floor roll conveys crop material further rear into a bale chamber where belts then urge the material upwardly and forwardly into engagement with sledge rolls. The sledge rolls coil crop material in a round direction to form and add to a bale acre. Continued feeding by pick tines 22 urge additional crop material into the forming bale in a generally spiral fashion growing the bale core. A wrapping assembly 52 comprises an active roll cavity 54. When the baler is in use, the active roll cavity 54 would house a roll of wrapping material which would spin around a material support cylinder 150 as wrapping material is fed into a feeding entry 56.

Figure 2:
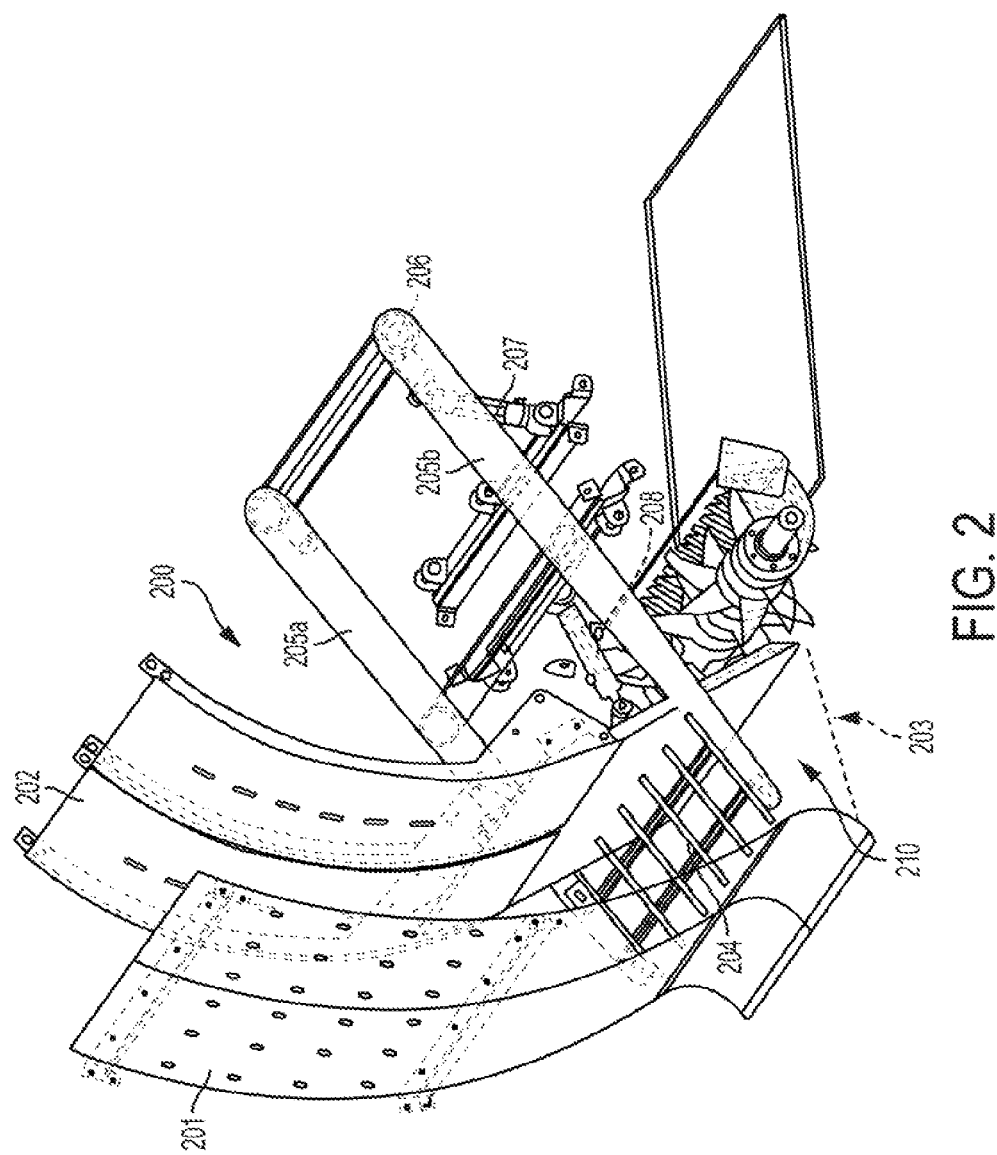
FIG. 2 depicts a three dimensional wireframe of a crop supply chamber with a control arm, movable rear wall, and associated hydraulic actuators.

FIG. 2 depicts a three dimensional image of an exemplary crop supply chamber, generally labeled 200. The crop supply chamber comprises a front wall 201 and a rear wall 202. The sidewalls of the crop supply chamber have been removed for clarity. The opening at the bottom of the crop supply chamber is the supply inlet, generally labeled 203. In between the front wall 201 and the rear wall 202 is the control plate 204, shown here as a connected series of bars. The control plate 204 is attached to a pair of control arms 205*a* and 205*b*, which are themselves attached to the sidewalls (not shown) at a pivot point 206. A hydraulic actuator 207, mounted to the sidewalls by a mounting bar, is attached to the control arms 205*a* and 205*b*. As the hydraulic actuator 207 extends, the controls arms 205*a* and 205*b* and the control plate 204 move upward in a radial motion around the pivot point 206. Another hydraulic actuator 208, mounted to the sidewalls by another mounting bar, is attached to the rear wall 202. As the hydraulic actuator 208 extends, the rear walls 202 moves inward.

The volume between the front wall 201, rear wall 202, the sidewalls (not shown), the supply inlet 203, and the control plate 204 is the storage volume, generally labeled 210. As the hydraulic actuator 207 extends, the control plate 204 moves to a higher position in between the front wall 201 and the rear wall 202, thus increasing the size of the storage volume 210. As the hydraulic actuator 207 retracts, the control plate 204 moves to a lower position in between the front wall 201 and the rear wall 202, thus decreasing the size of the storage volume 210. In some embodiments, crop material can be stored in the storage volume 210. In some embodiments, an increasing amount of crop material can be stored in the storage volume 210 as the control plate 204 moves to a higher position and the size of the storage volume 210 increases. In some embodiments, crop material stored in the storage volume 210 can be displaced out of the crop supply chamber 200 as the control plate 204 moves to a lower position and the size of the storage volume 210 decreases.

Figure 3A:
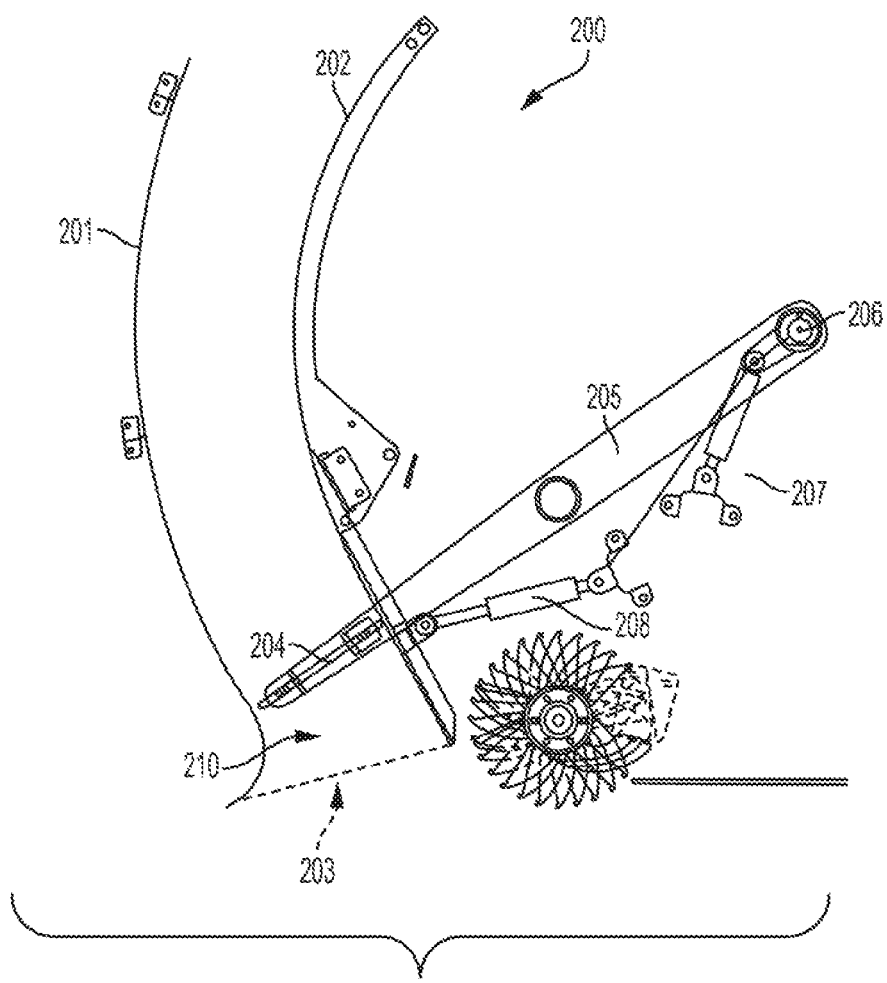
FIGS. 3A-3C depict various stages of a cross section wireframe of a crop supply chamber with a control arm, movable rear wall, and associated hydraulic actuators.
Figure 3B:
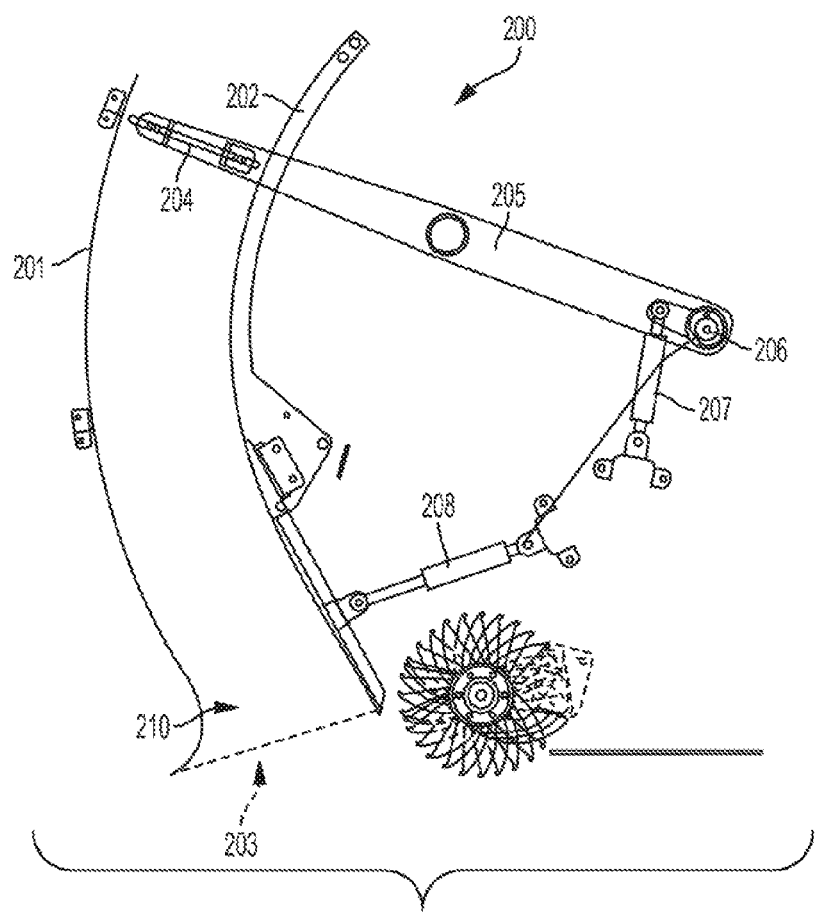
Figure 3C:
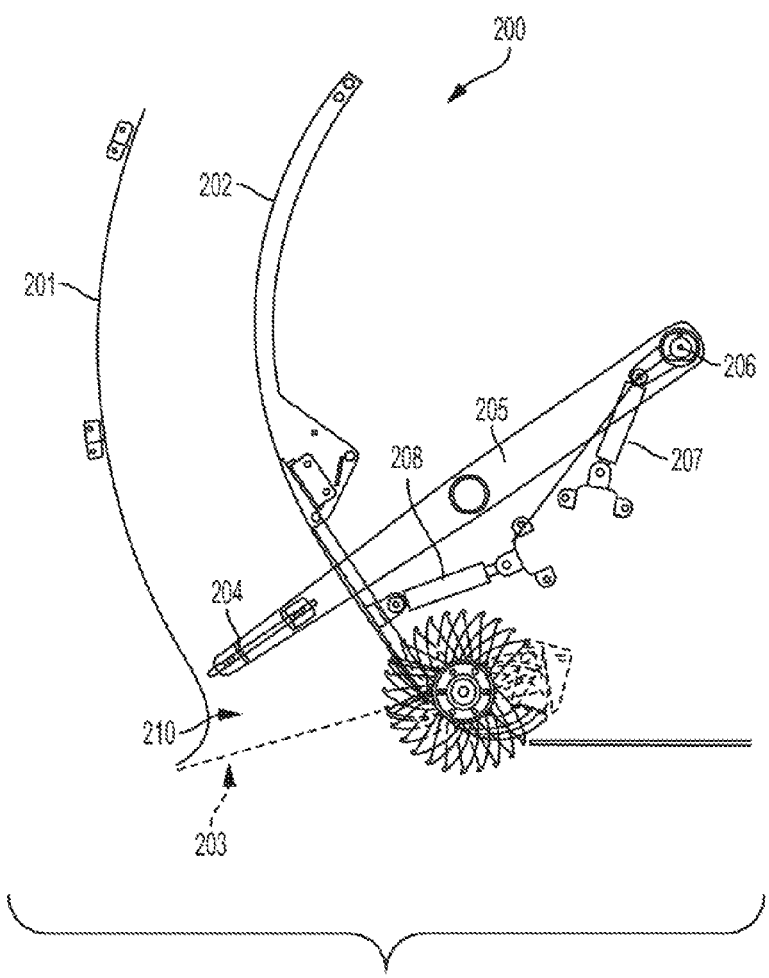

FIGS. 3A-3C depict a cross section of the exemplary crop supply chamber 200 in order to clearly show the movement of the control plate 204, the control arms 205 (just one is shown), and the rear wall 202. In FIG. 3A, the control plate 204 is in its lowest position and the rear wall 202 is in its forward position, therefor the storage volume 210 is at its smallest size. In some embodiments, crop material is not stored in the storage volume 210 as depicted in FIG. 3A, and instead passes directly into a bale chamber.

In FIG. 3B, the control plate 204 is in its highest position, and the rear wall 202 remains in its forward position. The hydraulic actuator of the control arm 207 is extended, and the control arm 205 has rotated around the pivot point 206. The storage volume 210, with the control plate 204 moved upward, is larger than in FIG. 3A. The hydraulic actuator of the rear wall 208 is extended, pushing the rear wall 202 forward and making the supply inlet 203 smaller. In some embodiments, crop material is stored in the storage volume 210 as depicted in FIG. 3B. In some embodiments, crop material is stored in the storage volume 210 as depicted in FIG. 3B, and is now ready to be ejected from the storage volume 210 and into a bale chamber.

In FIG. 3C, the control plate 204 is back in its lowest position, and the rear wall 202 is in its rearward position. The storage volume 210 is small, but it is not at its smallest size. The hydraulic actuator of the control arm 207 and the hydraulic actuator of the rear wall 208 are both retracted, making the supply inlet 203 larger, even though the storage volume 210 is smaller. In some embodiments, the pivot point of the rear wall 202 is at or approximately near the top of the rear wall 202. In some embodiments, the pivot point of the rear wall 202 is at or approximately near the middle section of the rear wall 202. In some embodiments, the rear wall 202 has one or more pivot points. In some embodiments, crop material has been ejected from the storage volume 210 as depicted in FIG. 3C. In some embodiments, the crop supply chamber 200 will revert back to the position depicted in FIG. 3A to prepare for the storage of additional crop material.

In some embodiments, the movement of the control plate 204 and the rear wall 202 are generally coordinated to maximize the ability of the crop supply chamber 200 to store and eject crop material from the storage volume 210. When crop material is entering into the crop supply chamber 200, the control plate 204 moves upwards while the rear wall 202 remains forward, such that, as the storage volume 210 continues to increase in size due to the upward movement of the control plate 204, the supply inlet 203 remains the same size. This allows crop material to easily enter into the storage volume 210 as it reaches maximum capacity, as the top of the storage volume 210 has a greater width than the width of the supply inlet 203. In some embodiments, the rear wall 202 moves backward slightly if crop material is having difficulty entering the crop supply chamber 200. In some embodiments, when crop material is ready to be ejected from the storage volume 210, the rear wall 202 moves to its forward position if not already there. When crop material is actively being ejected from the crop supply chamber 200, the control plate 204 moves downward while the rear wall 202 moves rearwards, such that, as the storage volume 210 continues to decrease in size due to the downward movement of the control plate 204, the supply inlet 203 increases in size due to the rearward movement of the rear wall 202. This allows the crop material to easily be ejected from the storage volume 210. In some embodiments, when the crop material is completely ejected from the storage volume 210, the rear wall 202 moves forward and the cycle can begin again. In some embodiments, the movement of the rear wall 202 and the control plate 204 are controlled by a controller or other processor unit. In some embodiments, the specific movement and timing of the rear wall 202 and/or the control plate 204 can be modified by a controller to account for variations in density, heat, moisture, and type of the crop material. For example, the rate of the rearward movement of the rear wall 202 can be increased, decreased, stopped, or even reversed during the ejection of crop material from the storage volume 210 in order to maintain a desired rate of crop ejection. As another example, the rate of the downward movement of the control plate 204 can be increased, decreased, stopped, or reversed during the ejection of the crop material from the storage volume 210. In some embodiments, the specific movement and timing of the rear wall 202 and control plate 204 are controlled independently of each other. In some embodiments, the specific movement and timing of the rear wall 202 and the control plate 204 are controlled simultaneously or sequentially.

FIGS. 4A-4F depict the function of the components of an exemplary cross-sectional side-view of a continuous harvester with a crop supply chamber and conveyor system. It is understood that the components of the harvester may function in a serial, stepwise, or simultaneous fashion, but that all steps described in FIGS. 4A, 4B, 4C, 4D, 4E, and 4F illustrate one embodiment of a single cycle of continuous baling for the purposes of the disclosure.

FIGS. 4A-4F depict the continuous harvester, generally labeled 400, comprising a pick-up assembly 410, a cutting rotor 412, a first feeding rotor 414, a second feeding rotor 416, a crop supply chamber 420, a conveyor system 440, and a bale chamber 450. The crop supply chamber 420 comprises a front wall 421, a rear wall 422, a rear wall pivot point 423, a rear wall hydraulic actuator 424, a supply inlet 425, a control plate 426, a control arm 427, a control arm pivot point 428, a control arm hydraulic actuator 429, and a storage volume 430. The conveyor system 440 comprises a first roller 441, a second roller 442, and a conveyor belt 443. The bale chamber 450 comprises a crop inlet 451 and a floor roller 452. The sidewalls of the harvester 400 are not shown for clarity.

Figure 4A:
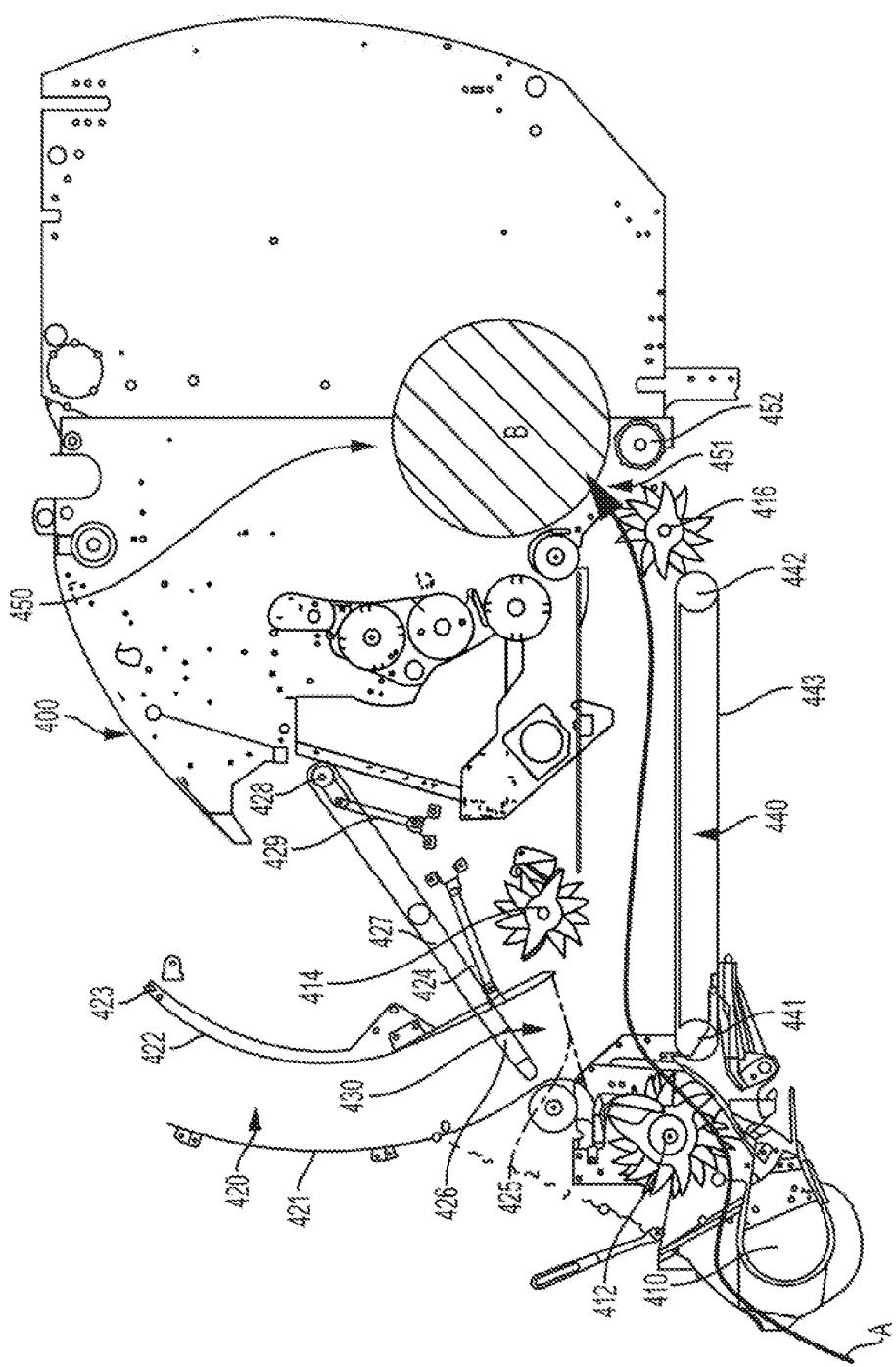

In FIG. 4A, the continuous harvester 400 is at the beginning of a first operational cycle. Crop in the field is usually arranged in a windrow as it is engaged by the harvester 400 being pulled along the windrow by a tractor (not shown). The generalized path of crop material through the harvester 400 is highlighted by arrow A. Crop material is moved off of the ground by the pick-up assembly 410 and fed into a cutting rotor 412, which optionally cuts the crop material before throwing it on the conveyor belt 443. In some embodiments, the crop material is thrown upwards by the cutting rotor 412 towards the supply inlet 425 and control plate 426. In some embodiments, the location of the control plate 426 prevents crop material from entering into the crop supply chamber 420. In some embodiments, the first feeding rotor 414 is rotating towards the bale chamber in FIG. 4A. In some embodiments, the location of the control plate 426 and the rotation of the first feeding rotor 414 cause crop material thrown from the cutting rotor 412 to move closer to the crop inlet 451. The top-most portion of the conveyor belt 443 is moving towards the crop inlet 451, being driven by the rotation of the first and second rollers 441 and 442. Crop material on the conveyor belt 443 is moved towards the crop inlet 451. As the crop material reaches the rear of the conveyor system 440, the crop material is thrown through the crop inlet 451 and into the bale chamber 450 by the second feeding rotor 416, which is rotating towards the bale chamber in FIG. 4A. Once in the bale chamber 450, the crop material is formed into a bale B, which grows in diameter and weight as additional crop material is added to the bale chamber 450.

Figure 4B:
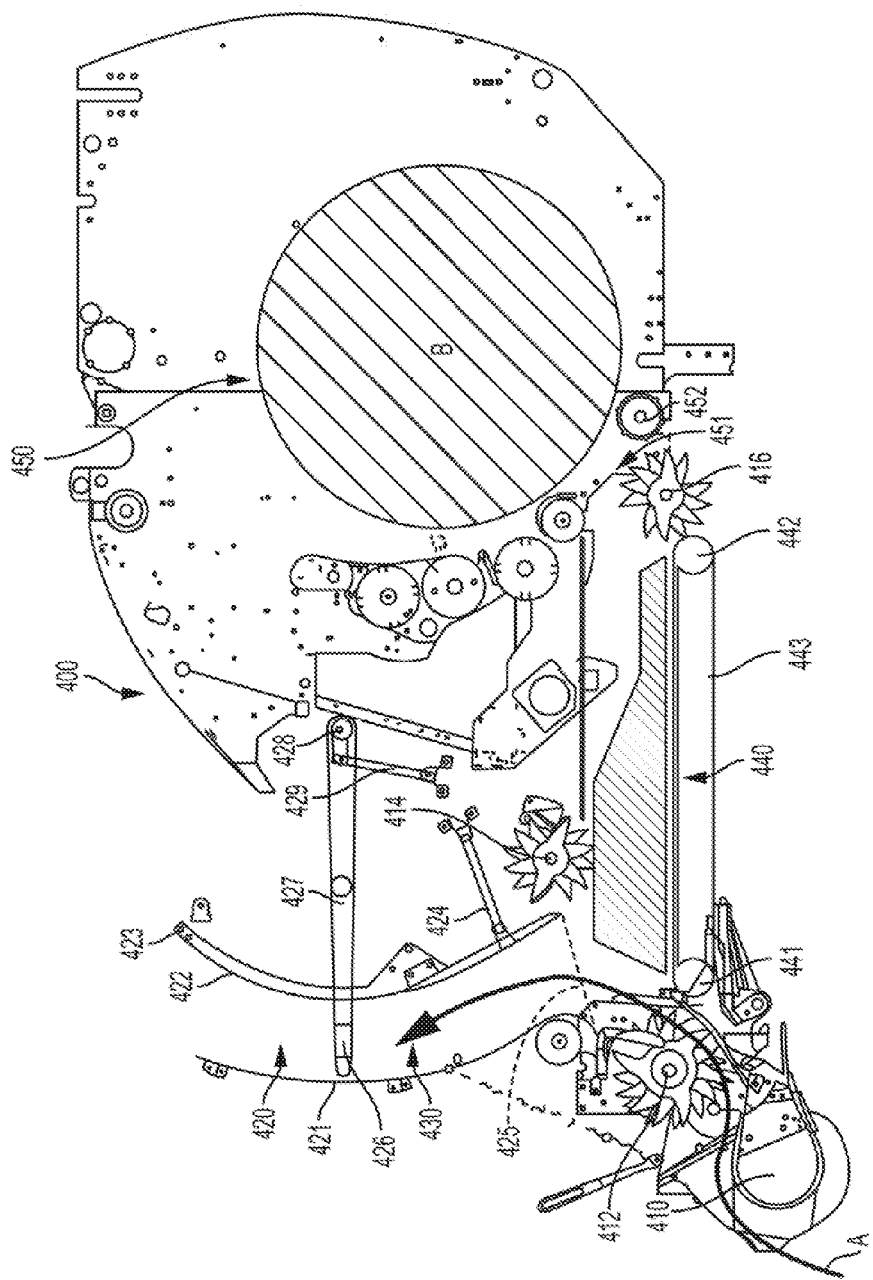

In FIG. 4B, the bale B has reached a pre-determined size in the bale chamber 450. In some embodiments, the pre-determined size is determined by a bale diameter sensor located in or proximate to the bale chamber 450. In some embodiments, the pre-determined size is determined by a bale weight sensor located in or proximate to the bale chamber 450. In conventional harvesting, a baler would now stop processing crop material in order to wrap and eject a completed bale. In FIG. 4B, the exemplary harvester 400 continues to collect crop material by the pick-up assembly 410, while also beginning the wrapping process for bale B. The conveyor system 440 cease its rotation, while the control arm hydraulic actuator 429 extends, causing the control arm 427 and the control plate 426 to move upward. In some embodiments, crop material located on the conveyor belt 443 when it ceases its rotation remains on the conveyor belt 443. As the control plate 426 moves upward in the crop supply chamber 420, the storage volume 430 increases in size. Crop material thrown by the cutting rotor 412 now enters the storage volume 430. As the control plate 426 continues to move upward toward its maximum position in the crop supply chamber 420, the storage volume 430 continues to increase in size. In the depicted embodiment, the rear wall 422 remains in a forward position. In some embodiments, the rear wall 422 begins to move rearward as the rear wall hydraulic actuator 424 begins to contract.

In FIG. 4C, the bale B has finished wrapping, and is now being ejected from the bale chamber 450. The control plate 426 has reached or is about to reach its maximum upward position in the crop supply chamber 420. The rear wall 422 remains in a forward position. Crop material continues to be collected from the ground by the pick-up assembly 410, processed by the cutting rotor 412, and thrown into storage volume 430, which is or is about its maximum size. The conveyor system 440 is still not rotating. In some embodiments, crop material remains on the conveyor belt 443. In some embodiments, the control plate 426 reaches its maximum upward position in the crop supply chamber 420 and the storage volume 430 reaches its maximum size when the bale B has been completely ejected from the bale chamber 450, and the bale chamber 450 is ready to begin forming a new bale.

Figure 4D:
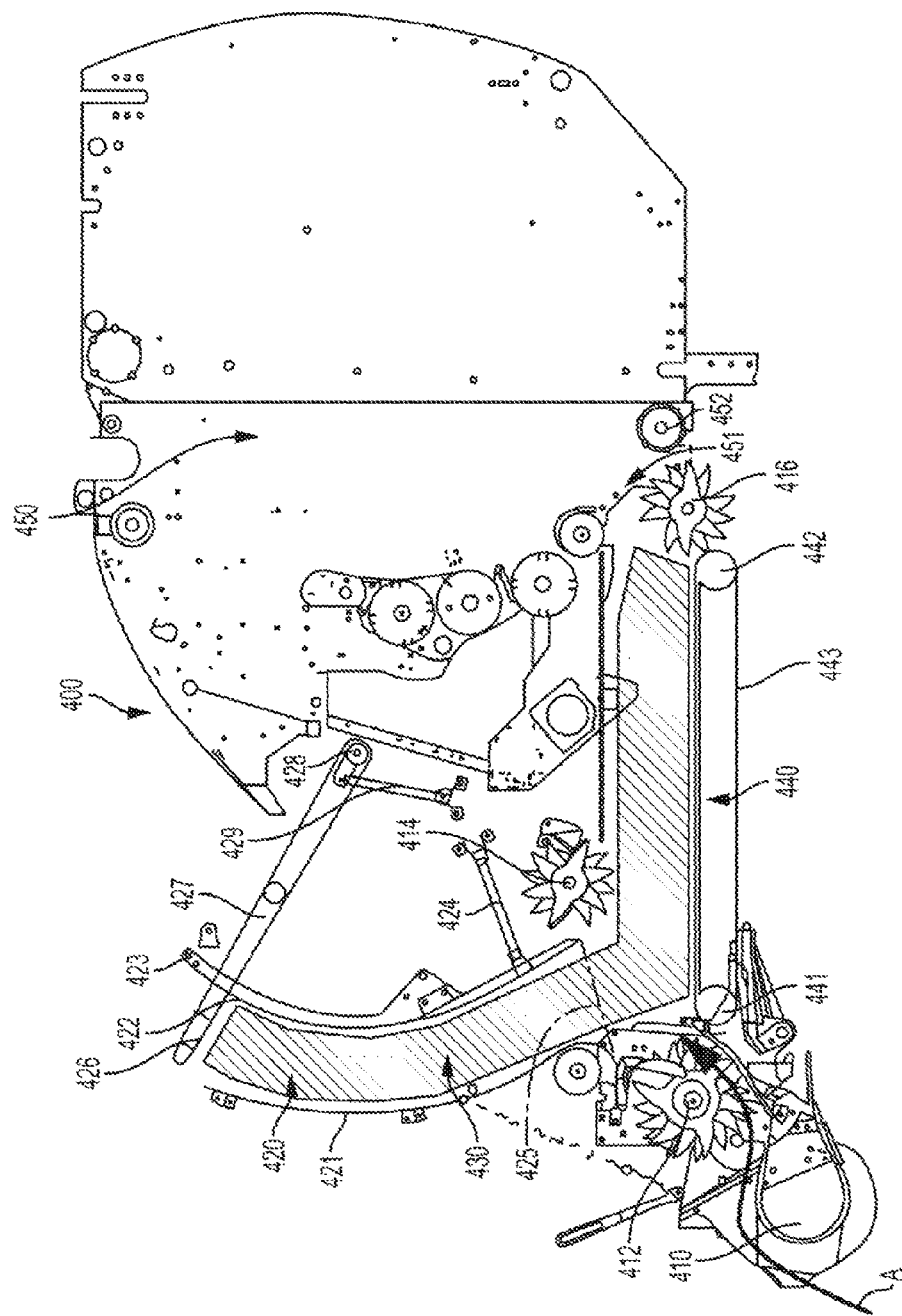

In FIG. 4D, the bale B has been completely ejected from the bale chamber 450, and is ready to begin forming a new bale. The conveyor belt 443 begins to rotate again, moving crop material present on the conveyor belt 443 into the bale chamber 450. In some embodiments, the first and second feeding rotors 414 and 416 are still rotating. In some embodiments, if the rear wall 422 is not in its forward position, the rear wall hydraulic actuator 424 extends, moving the rear wall 422 to its forward position. The control arm hydraulic actuator 429 begins to contract, moving the control arm 427 and the control plate 426 downward. As the control plate 426 moves downward in the crop supply chamber 420, the storage volume 430 decreases in size. Crop material stored in the storage volume 430 begins to be ejected from the crop supply chamber 420. Meanwhile, crop material continues to be collected from the ground by the pick-up assembly 410 and processed by the cutting rotor 412. Crop thrown by the cutting rotor 412 is again placed on the conveyor belt 443, as stored crop material is actively exiting the crop storage chamber 320. In some embodiments, crop entering the bale chamber 450 is coming from multiple locations. In some embodiments, the crop material that first enters the bale chamber 450 is crop material that was stored on the conveyor belt 443 when it ceased its rotation. In some embodiments, as crop material stored on the conveyor belt 443 is moved into the bale chamber 450, crop material from both the storage volume 430 and new crop material from the pick-up assembly 410 are placed on the conveyor belt 443 and moved into the bale chamber 450. In some embodiments, the rear wall 422 begins to move rearward as the rear wall hydraulic actuator 424 begins to contract.

Figure 4E:
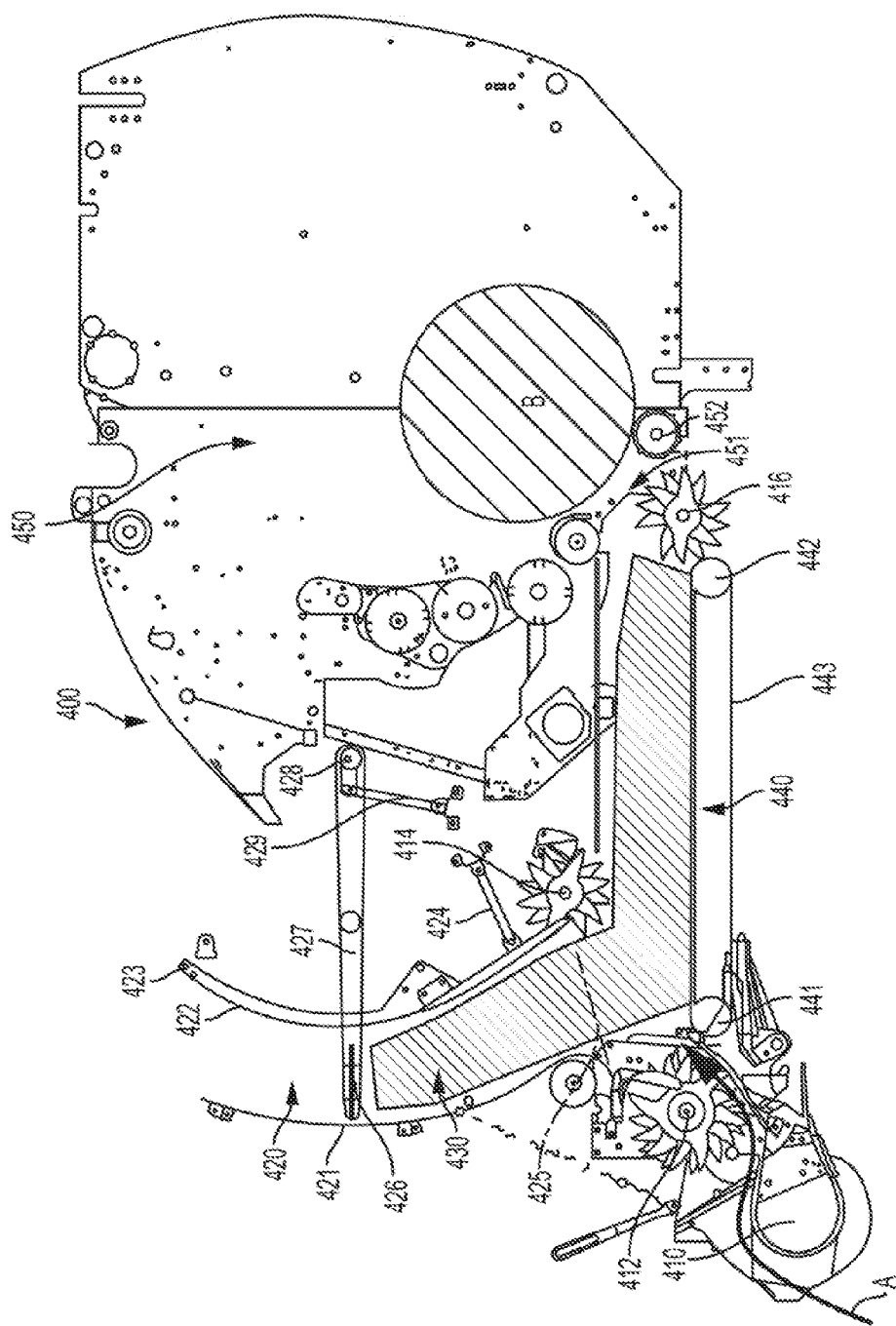

In FIG. 4E, a new bale B1 is partially formed in the bale chamber 450. The harvester continues to collect new crop material by the pick-up assembly 410, which is processed by the cutting rotor 412, and placed onto the conveyor belt 443. The control arm hydraulic actuator 429 continues to contract, moving the control arm 427 and the control plate 426 increasingly downward towards their maximum downward positions. Likewise, the storage volume 430 continues to decrease in size, and crop material stored in the storage volume 430 continues to be ejected onto the conveyor belt 443. The rear wall 422 moves rearward, expanding the size of the supply inlet 425. The first and second feeding rotors 414 and 416, and the conveyor system 440, continue to rotate, moving crop material placed on the conveyor belt 443 by both the cutting rotor 412 and the crop supply chamber 420 toward the crop inlet 451 of the bale chamber 450. In some embodiments, the movement of the rear wall 422 and the control plate 426 are controlled by a controller or other processor unit (not shown). In some embodiments, the specific movement and timing of the rear wall 422 and/or the control plate 426 can be modified by the controller to account for variations in density, heat, moisture, and type of the crop material. For example, the rate of the rearward movement of the rear wall 422 can be increased, decreased, stopped, or even reversed during the ejection of crop material from the storage volume 430 in order to maintain a desired rate of crop ejection. In some embodiments, the rate of crop ejection is determined by the resistance force enacted on the control arm hydraulic cylinder 429 by the crop material in the storage volume 430. In some embodiments, an increase in the resistance force on the control arm hydraulic cylinder 429 would indicate that crop material is ejecting from the storage volume 430 more slowly. In some embodiments, a decrease in the resistance force on the control arm hydraulic cylinder 429 would indicate that crop material is ejecting from the storage volume 430 more quickly. In some embodiments, the resistance force on the control arm hydraulic cylinder 429 is measured by one or more resistance force sensors. In some embodiments, the one or more resistance force sensors are in electronic communication with one or more controllers. As another example, the rate of the downward movement of the control plate 426 can be increased, decreased, stopped, or reversed during the ejection of the crop material from the storage volume 430. In some embodiments, the specific movement and timing of the rear wall 422 and control plate 426 are controlled independently of each other. In some embodiments, the specific movement and timing of the rear wall 422 and the control plate 426 are controlled simultaneously or sequentially.

Figure 4F:
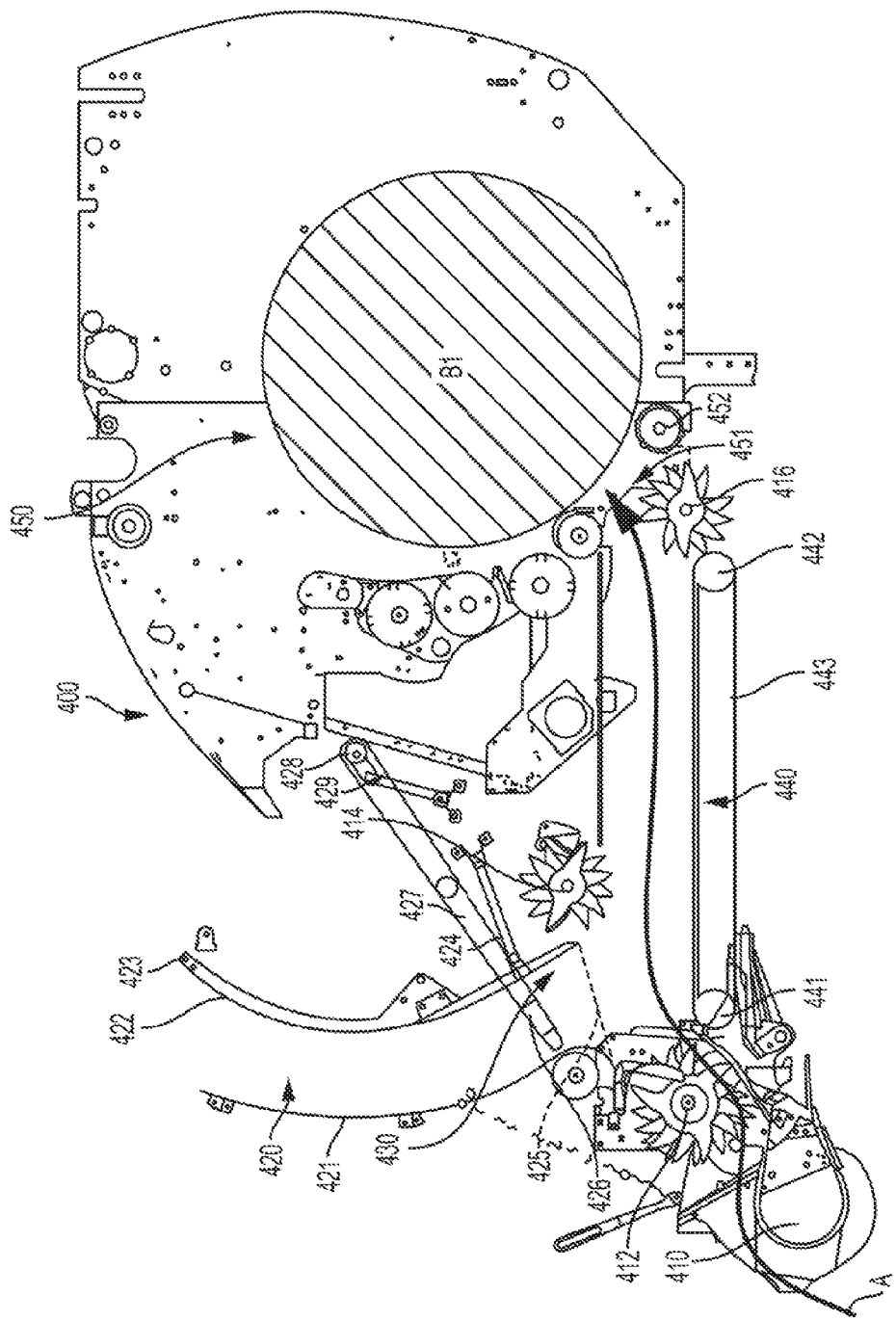

In FIG. 4F, the bale B1 is just about to reach the pre-determined size in the bale chamber 450. The control plate 426 has reached or is about to reach its maximum downward position in the crop supply chamber 420. The storage volume 430 has been decreasing in size, and now all or almost all of the stored crop material has been ejected from the storage volume 430. The rear wall 422 is moved forward again, resetting the size of the supply inlet 425. Crop material continues to be collected from the ground by the pick-up assembly 410, processed by the cutting rotor 412, and thrown onto the conveyor system 440. The first and second feeding rotors 414 and 416, and the conveyor system 440 are rotating, moving crop material into the bale chamber 450. In some embodiments, the control plate 426 reaches is maximum downward position in the crop supply chamber 420 and the storage volume 430 reaches its minimum size immediately before or right as the bale B1 reaches the pre-determined size. When the bale B1 has reached the pre-determined size, the process reverts back to stage depicted in FIG. 4B, where the conveyor system 440 cease its rotation, the control arm 427 and the control plate 426 move upwards, and harvested crop material is thrown into the storage volume 430 as the bale B1 begins to be wrapped and ejected from the harvester.

Figure 5A:
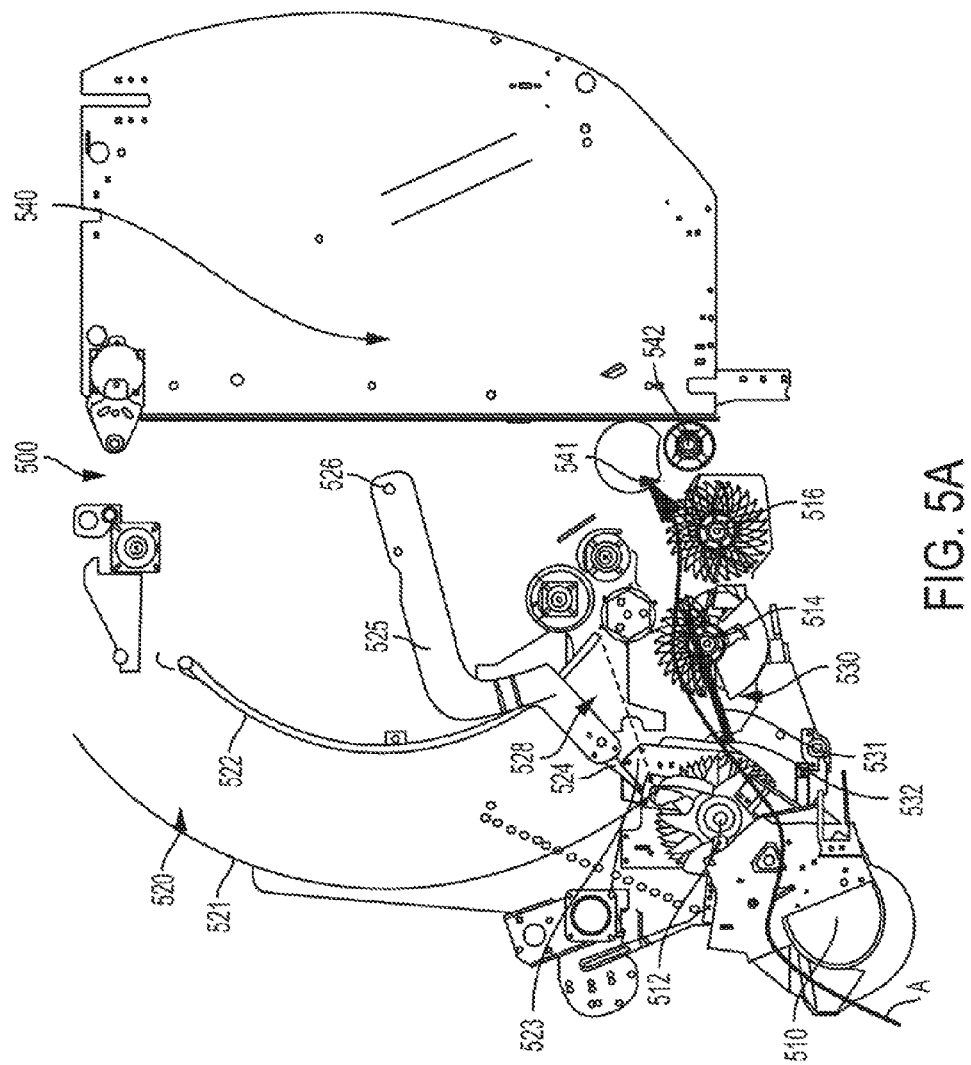
FIGS. 5A-5B depict various stages of a harvester with a crop supply chamber and a deflection system.
Figure 5B:
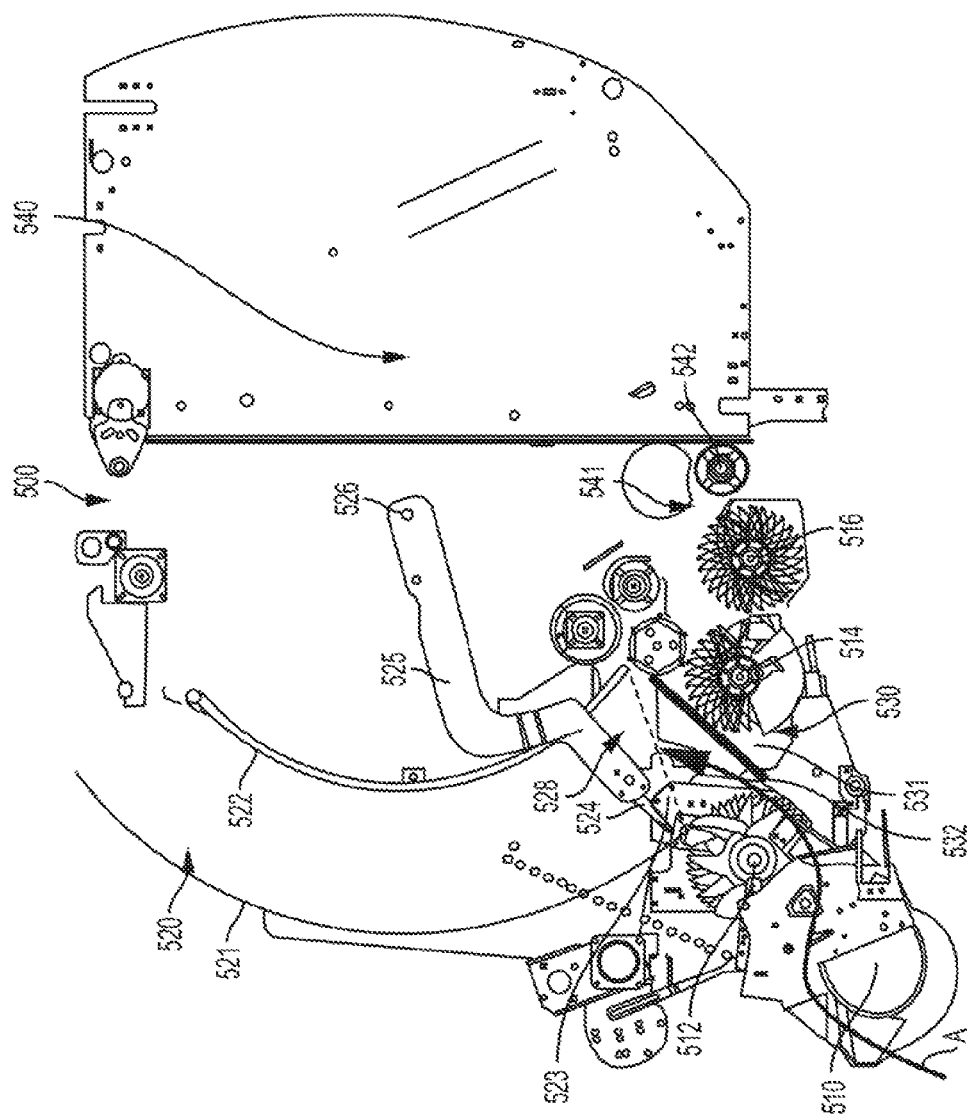

FIGS. 5A and 5B depict the continuous harvester, generally labeled 500, comprising a pick-up assembly 510, a cutting rotor 512, a first feeding rotor 514, a second feeding rotor 516, a crop supply chamber 520, a deflection system 530, and a bale chamber 540. The crop supply chamber comprises a front wall 521, a rear wall 522, a supply inlet 523, a control plate 524, a control arm 525, a control arm pivot point 526, a hydraulic actuator (not shown), and a storage volume 528. The deflection system 530 comprises a deflection panel 531, and a deflection panel pivot point 532. The bale chamber 540 comprises a crop inlet 541 and a floor roller 542. The sidewalls of the harvester 500 are not shown for clarity.

Unlike a conveyor system which turns on or off, the deflection system 530 allows the deflection panel 531 to move between a lowered position that does not occlude the crop inlet 541 of the bale chamber 540, and a raised position that does occlude the crop inlet 541. In FIG. 5A, The generalized path of crop material through the harvester 500 is highlighted by arrow A. Crop material is moved off of the ground by the pick-up assembly 510 and fed into a cutting rotor 512, which optionally cuts the crop material before throwing it towards the deflection panel 531. In some embodiments, the crop material is thrown upwards by the cutting rotor 512 towards the supply inlet 523 and control plate 524. In some embodiments, the location of the control plate 524 prevents crop material from entering into the crop supply chamber 520. In some embodiments, the first feeding rotor 514 is rotating towards the bale chamber in FIG. 3A. In some embodiments, the location of the control plate 524 and the rotation of the first feeding rotor 514 cause crop material thrown from the cutting rotor 512 to move closer to the crop inlet 541. The deflection panel 531 is in a lower position, and does not block the movement of the crop material toward the bale chamber 540. As the crop material comes closer to the crop inlet 541, the crop material is thrown through the crop inlet 541 and into the bale chamber 540 by the second feeding rotor 516, which is rotating towards the bale chamber in FIG. 3A. Once in the bale chamber 540, the crop material is formed into a bale B, which grows in diameter and weight as additional crop material is added to the bale chamber 540. In some embodiments, the rear wall 522 is in its forward position. In some embodiments, the movement of the rear wall 522 is controlled by a rear wall hydraulic actuator (not shown).

In FIG. 5B, the exemplary harvester 500 collects crop material by the pick-up assembly 510, the general path of which is highlighted by arrow A. The deflection panel 531 moves to its raised position. In some embodiments, the control arm hydraulic actuator (not shown) would begin to extend, causing the control arm 525 and the control plate 524 to begin to move upward. In some embodiments, the first and second feeding rotors 514 and 516 continue their rotations. Crop material thrown by the cutting rotor 512 now enters the storage volume 528. In some embodiments, as the control plate 524 begins to move upward, the rear wall 522 would begin to move rearward.

Throughout the embodiments of the disclosure, the movement of the control plate within the crop supply chamber, and therefore the change of the size of the storage volume, is controlled throughout the harvesting process. In some embodiments, the positions of the control plate and the control arm are controlled throughout the harvesting process. In some embodiments, the speeds of the control plate and the control arm are controlled throughout the harvesting process. In some embodiments, both the positions and the speeds of the control plate and the control arm are controlled throughout the harvesting process. In some embodiments, a control arm sensor is on or proximate to the control arm or the control arm hydraulic actuator, and is capable of determining the position and/or speed of the control arm. The control arm sensor is in electronic communication with an electronic control unit ("ECU"), or other controller. In some embodiments, the controller controls the position and the speed of the control plate and the control arm by controlling the extension and retraction of the control arm hydraulic actuator.

Figure 6:
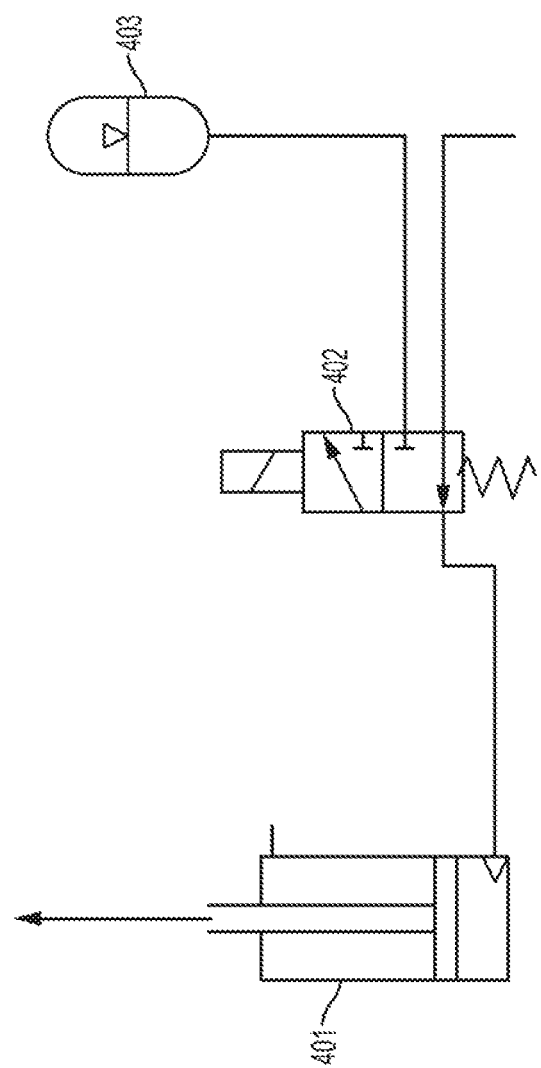
FIG. 6 depicts a hydraulic flow diagram for a rear wall hydraulic actuator.

FIG. 6 depicts a hydraulic flow diagram of an hydraulic circuit for a rear wall hydraulic actuator 401. In some embodiments, the rear wall hydraulic actuator 401 is connected to the main hydraulic circuit for a harvester. In a continuous harvester comprising a crop supply chamber, the movement of the rear wall of the crop supply chamber can be dynamic. For example, the rate of the rearward movement of the rear wall can be increased, decreased, stopped, or even reversed. To control this movement, a control valve 402 controls the rate and direction of hydraulic flow to the rear wall hydraulic actuator 401. In combination with a hydraulic accumulator 403 that can store or release hydraulic fluid, the control valve 402 is capable of controlling the rate and direction of movement of the rear wall hydraulic actuator 401. In some embodiments, the control valve 402 is in operable communication with at least one controller. In some embodiments, the at least one controller is capable of adjusting the position of the control valve 402 in real time. In some embodiments, the at least one controller is capable of controlling the rate and direction of movement of the rear wall of a crop supply chamber by adjusting the position of the control valve 402. In some embodiments, a harvester comprising a crop supply chamber comprises one or more of the hydraulic flow diagrams depicted in FIG. 6.

In some embodiments, a controller can obtain one or more of the following parameters from one or more control arm sensors and/or one or more bale diameter sensors:

Instantaneous Bale Diameter ($D_i$)
Full Bale Diameter ($D_f$)
Arm Motion Range ($Degrees_{arm}$)
Instantaneous Arm Position ($Degrees_i$)
Elapsed Time Between Readings (T)
Resistance Force on Control Arm ($R_{arm}$)

In some embodiments, the controller is capable of calculating one or more parameters to control the movement of the control arm, including but not limited to:

$$\text{Bale Growth Rate(BGR)} = (D_{i+1}^2 - D_i^2)/T$$

$$\text{Time Until Full Bale}(T_{FB}) = (D_f - D_i^2)/\text{BGR}$$

$$\text{Speed of Control Arm}(V_{arm}) = (Degrees_{arm} - Degrees_i)/T_{FB}$$

In some embodiments, the controller is in operable communication with an operator interface. The controller can display information pertaining to one or more parameters to provide an operator with information regarding one or more of the following: operable mode of the harvester, position of the control plate in the crop supply chamber, position of the rear wall in the crop supply chamber, rate of crop ejection from the crop supply chamber, direction of crop flow into or out of the crop supply chamber, position of the crop gating system, size of the bale in the bale chamber, and position of the tailgate. In some embodiments, the operator interface is capable of allowing an operator to control the independently selectable movement of moving components of the harvester, including but not limited to the position of the control arm, the position of the rear wall, and the position of the tailgate. In some embodiments, the operator interface is capable of allowing an operator to control the operable mode of the harvester. In some embodiments, the operator interface is located within or on a tractor associated with the continuous harvester.

In some embodiments, the harvesters disclosed herein comprise a bale ejection system comprises at least three, four, or five pairs of pivot points from which arms attached to a sidewall extend transversely to a pair of parallel bars. In some embodiments, the distance between the parallel bars is defined by the length of the at least one, two, or three fixed members affixed to each parallel bar and around which a first, second, and third roller, respectively, spin on their respective rotatable axes. In some embodiments, the first roller is positioned most rearward from the front of the bale ejector and collects slack in the conveyor belt which is in operable contact with the bale when the bale carrier is raised at any angle. In some embodiments, the second roller positioned between the first and third rollers, yet more proximate to the first roller, creates tension in one or a plurality of baling belts and deflects the one or plurality of baling belts away from the bale chamber until the one or more baling belts wrap around the third roller. In some embodiments, the third roller, or lowermost roller, supports some of the bale's weight in the bale chamber while the bale carrier is in its fully closed position. In some embodiments, the third roller also functions to guide the one or plurality of baling belts in the upward direction and around the bale in the bale chamber. In some embodiments, the harvester comprises a bale chamber defined by a plurality of fixed rollers positioned frontward to the bale chamber and an outlet of a transverse pickup, wherein at least one of the plurality of fixed rollers is adjacent to the outlet of the transverse pickup. In some embodiments, the plurality of fixed rollers positioned frontward to the bale chamber comprises at least three fixed rollers, wherein at least one of the plurality of fixed rollers positioned frontward to the bale chamber is positioned adjacent to the outlet of the transverse pickup. In some embodiments, the plurality of fixed rollers positioned frontward to the bale chamber comprises at least four fixed rollers, wherein at least one of the plurality of fixed rollers positioned frontward to the bale chamber is positioned adjacent to the outlet of the transverse pickup.

In some embodiments, the bale ejection system comprises one or more hydraulic tensioning actuators that extend to raise at least a first and second pair of arms extending from the sidewalls of the bale chamber to one of multiple positions. In some embodiments, the first and second pair of arms pivot and can remain stationary at any angle above its closed position about a first and a second pair of pivot points. In some embodiments, the bale carrier can be raised by extension of the tension actuators mechanically attached to the first and/or second pair of arms, and the first pair and/or second pair of arms are raised around the first and/or second, respectively, pair of pivot points until the first pair of arms swings upwardly at no more than about 90 degrees from where the arms are positioned in a fully closed position. In some embodiments, the first and second pair of arms pivot and can remain stationary at any angle above its closed position about a first and a second pair of pivot points. In some embodiments, the bale carrier can be raised by extension of the tension actuators mechanically attached to the first and/or second pair of arms, and the first pair and/or second pair of arms are raised around the first and/or second, respectively, pair of pivot points until the first pair of arms swings upwardly at no more than about 60 degrees from where the arms are positioned in a fully closed position. In some embodiments, the first and second pair of arms pivot and can remain stationary at any angle above its closed position about a first and a second pair of pivot points. In some embodiments, the bale carrier can be raised by extension of the tension actuators mechanically attached to the first and/or second pair of arms, and the first pair and/or second pair of arms are raised around the first and/or second, respectively, pair of pivot points until the first pair of arms swings upwardly at no more than about 30 degrees from where the arms are positioned in a fully closed position. In some embodiments, the bale carrier can be raised and stopped around at least a first and a second pair of pivot points by at least a first and second pair of arms extending from each sidewall of the bale chamber at any angle above its closed position. In some embodiments, the bale carrier is raised upward around at least a first and a second pair of pivot points by at least a first and second pair of arms extending from each sidewall of the bale chamber until the first pair of arms reaches between about 60 to about 90 degrees from its angle at a closed position.

In some embodiments, the bale carrier is mechanically attached to one or more of the bale chamber rollers positioned in the front of the bale chamber, whereupon raising the bale carrier to any angle above its closed position causes the one or more bale chamber rollers to raise upward and/or rearward to kick out a bale within the bale chamber through the outlet at the rear of the bale chamber. In some embodiments, the bale carrier is mechanically attached to one or more bale chamber rollers attached to one or more of the bale chamber rolls positioned in the front of the bale chamber, wherein an operator of the bale carrier has the option of moving the one or more bale chamber rollers at any vector upward or laterally rearward when the bale carrier is raised to any angle above its closed position. In some embodiments, the agricultural harvester comprises one or more bale chamber rollers, each bale chamber roller moveable upon one or more axes so that, when the bale is evacuated from the bale chamber, the operator has an option to move the bale chamber rollers from a stationary position within the bale chamber to strike a bale within the bale chamber and cause the bale to exit through an outlet at the rear of the bale chamber at an accelerated rate as compared to a rate of speed at which the bale would evacuate the bale chamber without moving the bale chamber roller. In some embodiments the movable chamber roller is spring-loaded and mechanically attached to the bale carrier of the present disclosure.

In some embodiments, a thin metal plate is attached to the pair of bars to cover the rearward side of the fixed members positioned within the bale carrier and create a rear face to the bale carrier.

In some embodiments, at least one, two, three, or more sensors are positioned within the bale chamber to detect the size of the bale within the bale chamber. In some embodiments, the bale chamber comprises at least one, two, three or more sensors that operably connected to an indicator light visible to the operator of the bale carrier and/or operably connected to a controller on the agricultural harvester within which the bale carrier is positioned. The controller may be engaged by the operator of the agricultural harvester when the agricultural harvester is functioning so that the operator may identify how large or small the bale is at a given time during operation. In some embodiments, the at least one, two, or three sensors within the bale chamber are automatically engaged to sense how large the bale is when the agricultural harvester is functioning. In some embodiments, the at least one, two, or three sensors within the bale chamber are automatically engaged to sense whether the bale chamber is at or near full capacity.

Having described a series of embodiments, it will become apparent that various modifications can be made without departing from the scope of the disclosure as defined in the accompanying claims. Various publications, including patents, published applications, technical articles and scholarly articles are cited throughout the specification. Each of these cited publications and patent applications is incorporated by reference herein in its entirety.

What is claimed is:

1. A harvester comprising:
   a pair of oppositely facing sidewalls, mechanically attached to a subframe;
   a pickup assembly;
   a bale chamber comprising a crop inlet at the front end of the bale chamber, and an outlet at the rear end of the bale chamber;
   a crop supply chamber in front of the bale chamber, comprising a front wall, a rear wall, side walls; a control plate positioned for movement within the crop supply chamber and a supply inlet at the bottom of the chamber, wherein a storage volume of the crop supply chamber is defined by the space between the front wall, the rear wall and sidewalls and the rear wall is selectively adjustable in a forward and a rearward direction by at least one rear wall actuator, the rear wall actuator operably connected to the rear wall such that extension of the actuator moves the rear wall;
   a crop gating system, positioned between the front of the crop inlet of the bale chamber and the pickup assembly, further positioned below the supply inlet of the crop supply chamber; wherein the crop gating system comprises at least a first element movable in at least a first and second operable position, wherein in the first operable position the crop gating system facilitates the movement of crop material from the pickup assembly into the bale chamber.

2. The harvester of claim 1, wherein the movement of the rear wall is around a rear wall pivot point by the rear wall actuator is capable of altering the shape of the storage volume, such that, when the bottom of the rear wall moves in a forward direction, the distance between the front wall and the rear wall is smaller at the bottom than the top of the crop supply chamber, and when the bottom of the rear wall moves in a rearward direction, the distance between the front wall and the rear wall is larger at the bottom than the top of the crop supply chamber.

3. The harvester of claim 1, wherein the height of the crop supply chamber is substantially higher than its width, and at least a portion of the crop supply chamber is arced and adjacent to or substantially adjacent to the bale chamber; and wherein the control plate covers at least one horizontal plane of the crop supply chamber and its edges contact or are proximate to each of the front wall, rear wall, and sidewalls, such that the control plate defines a vertical or substantially vertical height of the storage volume.

4. The harvester of claim 2, wherein the crop supply chamber further comprises:
   a control arm pivot point, positioned between the pair of sidewalls;
   at least one control arm, operably connected to the control plate at one end and to the control arm pivot point at the other end; and
   at least one control arm actuator operably connected to the at least one control arm;
   wherein the control arm pivot point is positioned between the storage volume and the bale chamber; and wherein the control plate and control arms are capable of movement in an upward and a downward direction around the control arm pivot point.

5. The harvester of claim 4, wherein the movement of the control plate and control arms by the control arm actuator is capable of altering the shape of the storage volume, such that, when the control plate moves in a radially upward direction, the storage volume increases in size, and when the control plate moves in a radially downward direction, the storage volume decreases in size.

6. The harvester of claim 5, wherein the crop supply chamber further comprises a first, second, and third operable positions, wherein:
   the first operable position, the rear wall is positioned in a forward direction and the control plate is positioned at or approximately at the bottom of the front and rear walls, such that the control plate occludes the supply inlet of the crop supply chamber and the storage volume is or approximately is zero;
   the second operable position, the rear wall is positioned in the forward direction and the control plate is positioned at or approximately at the top of the front and rear walls, such that the distance between the front and rear walls is smaller at the bottom than the top of the crop supply chamber, the control plate does not occlude the supply inlet of the crop supply chamber, and the storage volume is at or approximately at a maximum size;
   the third operable position, the rear wall is positioned in a rearward direction and the control plate is positioned at or approximately at the bottom of the front and rear walls, such that the distance between the front and rear walls is larger at the bottom than the top of the crop supply chamber and the control plate partially occludes the supply inlet of the crop supply chamber.

7. The harvester of claim 6, wherein the at least one rear wall actuator can move the rear wall around the rear wall pivot point, and the at least one control arm actuator can rotate the at least one control arm and the control plate around the control arm pivot point, such that the crop supply chamber can transition between the first, second, and third operable positions and the storage volume can transition between zero and the maximum size.

8. The harvester of claim 7, wherein crop material enters into the storage volume of the crop supply chamber when the crop supply chamber is transitioning from the first operable position to the second operable position; and
   wherein crop material stored in the storage volume enters into the bale chamber the crop supply chamber is transitioning from the second operable position to the third operable position.

9. The harvester of claim 8, further comprising:
   a serpentine system arranged for the bale chamber, comprising a plurality of baling belt rollers in operable contact with one or more baling belts, the plurality of baling belts rollers comprising at least two lower baling belt rollers positioned on either side of the crop inlet of the bale chamber;
   a tailgate, capable of occluding the outlet of the bale chamber in a closed position and exposing the outlet of the bale chamber in one or more open positions;
   a net wrap mechanism, positioned at the rear of the harvester, capable of wrapping a formed bale in the bale chamber prior to ejection of said bale from the harvester;
   a cutting rotor, position between the pickup assembly and the crop gating system;

a feeding rotor, capable of assisting the entry of crop material into the bale chamber;

a bale diameter sensor, capable of determining the size of a bale in the bale chamber;

a control arm sensor, capable of determining the position of the control arm and control plate in the crop supply chamber;

a rear wall sensors, capable of determining the position of the rear wall of the crop supply chamber; and a controller, operably connected to the bale diameter sensor, the control arm sensor, the rear wall sensor, the at least one rear wall actuator, the at least one control arm actuator, and the crop gating system.

10. The harvester of claim 9, further comprising at least a first, second, and third operable modes, wherein in the first operable mode, crop material is collected by the pickup assembly, passed through the cutting rotor, and directed into the bale chamber by the crop gating system;

in the second operable mode, the crop supply chamber transitions from the first operable position to the second operable position; wherein crop material is collected by the pickup assembly, passed through the cutting rotor, and directed into the crop supply chamber;

in the third operable condition, the crop supply chamber transitions from the second operable position to the third operable position; wherein crop material is collected by the pickup assembly, passed through the cutting rotor, directed into the bale chamber by the crop gating system, and, simultaneously, stored crop material in the storage volume exits the crop supply chamber and is also directed into the bale chamber by the crop gating system.

11. The harvester of claim 10, wherein the harvester transitions from the first or the third operable mode to the second operable mode when the bale chamber has reached a predetermined size.

12. The harvester of claim 10, wherein the harvester transitions from the second operable mode to the third operable mode when no bale exists in the bale chamber.

13. The harvester of claim 12, wherein the controller independently adjusts the movement of the control plate and the rear wall such that, during the third operable mode of the harvester, the crop supply chamber is at the third operable position prior to the bale in the bale chamber reaching its predetermined size.

14. The harvester of claim 12, wherein the controller independently adjusts the movement of the control plate and the rear wall such that, during the third operable mode of the harvester, the crop supply chamber reaches its third operable position simultaneously with the bale in the bale chamber reaching its predetermined size.

15. The harvester of claim 10 further comprising an operator interface, capable of receiving information from and electronically connected to the controller, and displaying the information to an operator, wherein the information comprises one or more of the following: operable mode of the harvester, position of the control plate in the crop supply chamber, position of the rear wall in the crop supply chamber, and direction of crop flow into or out of the crop supply chamber.

16. The harvester of claim 1, wherein the crop gating system further comprises a deflection panel operably connected to and capable of radial movement around a second pivot point positioned between the pair of sidewalls of the harvester; and a deflection actuator, operably connected to the controller and capable of moving the deflection panel around the second pivot point.

17. The harvester of claim 1, wherein the crop gating system further comprises a conveyor system, positioned between the front of the crop inlet of the bale chamber and the pick assembly, and, further positioned below the supply inlet of the crop supply chamber, the conveyor system comprising: a front roller, a rear roller, at least one conveyor belt, and a motor operably connected to the controller and capable of endlessly rotating the conveyor belt around the front and rear rollers of the crop gating system; wherein the at least one conveyor belt rotates around the front and rear rollers such that, at any point in time, the top portion of the conveyor belt moves towards the inlet in the first operable mode of the crop gating system;

and wherein the at least one conveyor belt does not rotate around the front and rear rollers in the second operable mode of the crop gating system.

18. A harvester comprising:
a pair of oppositely facing sidewalls, mechanically attached to a subframe;
a pickup assembly;
a bale chamber comprising a crop inlet at the front end of the bale chamber, and an outlet at the rear end of the bale chamber; and
a crop supply chamber in front of the bale chamber, comprising a supply inlet at the bottom of the crop supply chamber, a front wall, a rear wall, and side walls, wherein a storage volume of the crop supply chamber is defined by the space between the front wall, the rear wall, sidewalls and the supply inlet and the rear wall is selectively adjustable in a forward and a rearward direction by at least one rear wall actuator, the rear wall actuator operably connected to the rear wall such that extension of the actuator moves the rear wall.

19. The harvester of claim 18, wherein the height of the rear wall is substantially higher than its width, and at least a portion of the crop supply chamber is arced and adjacent to or substantially adjacent to the bale chamber.

20. The harvester of claim 18, wherein the movement of the rear wall is around a rear wall pivot point by the rear wall actuator alters the shape or is capable of altering the shape of the storage volume, such that, when the bottom of the rear wall moves in a forward direction, the distance between the front wall and the rear wall is smaller at the bottom than the top of the crop supply chamber, and when the bottom of the rear wall moves in a rearward direction, the distance between the front wall and the rear wall is larger at the bottom than the top of the crop supply chamber.

21. The harvester of claim 20, wherein the movement of the rear wall is capable of controlling the rate at which crop material enters into and ejects from the crop supply chamber.

22. A method of harvesting crop material comprising:
(a) collecting crop material by a pickup assembly;
(b) preventing entry of crop material into a crop supply chamber and allowing entry of crop material into a bale chamber by a crop gating system;
(c) detecting when crop material has formed a bale of predetermined size;
(d) wrapping and ejecting the bale while simultaneously allowing entry of crop material into the crop supply chamber and preventing entry of crop material into the bale chamber by a crop gating system wherein a storage volume of the crop supply chamber is defined by the space between a front wall, a rear wall, sidewalls and the crop inlet of the chamber and the rear wall is selectively adjustable in a forward and a rearward direction by at least one rear wall actuator, the rear wall actuator operably connected to the rear wall such that extension of the actuator moves the rear wall;
(e) detecting when the bale of crop material has been ejected from the bale chamber;
(f) ejecting crop material from the crop supply chamber while continuing to collect new crop material by the pickup assembly; and
(g) allowing entry of crop material from both the crop supply chamber and the pickup assembly into the bale chamber by a crop gating system.

23. The method of claim 22, further comprising (h) repeating steps (c) to (g).

24. The method of claim 22, wherein preventing entry of crop material into a crop supply chamber in step (b), allowing entry of crop material into the crop supply chamber in steps (d) and (g), and ejecting crop material from the crop supply chamber in step (f) are performed by the synchronous movement of a control plate and a rear wall.

25. The method of claim 22, further comprising providing information to an operator via an operator interface about one or more of the following: position of the control plate in the crop supply chamber, position of the rear wall in the crop supply chamber, and direction of crop flow into or out of the crop supply chamber.

* * * * *